US011783549B2

(12) United States Patent
Liu

(10) Patent No.: US 11,783,549 B2
(45) Date of Patent: Oct. 10, 2023

(54) METHOD FOR OBSERVING VIRTUAL ENVIRONMENT, DEVICE, AND STORAGE MEDIUM

(71) Applicant: TENCENT TECHNOLOGY (SHENZHEN) COMPANY LIMITED, Guangdong (CN)

(72) Inventor: Bojun Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/180,018

(22) Filed: Feb. 19, 2021

(65) Prior Publication Data
US 2021/0201591 A1    Jul. 1, 2021

Related U.S. Application Data

(63) Continuation of application No. PCT/CN2019/115623, filed on Nov. 5, 2019.

(30) Foreign Application Priority Data

Dec. 5, 2018    (CN) .......................... 201811478458.2

(51) Int. Cl.
*G06T 19/00*    (2011.01)
(52) U.S. Cl.
CPC .................. *G06T 19/006* (2013.01)
(58) Field of Classification Search
CPC ........ G06T 19/006; G06F 3/005; G06F 3/011; G06F 3/04815; G06F 3/013; G06F 2203/012
See application file for complete search history.

(56) References Cited

U.S. PATENT DOCUMENTS 5,850,352 A * 12/1998 Moezzi .................. G06T 15/10
345/419
8,979,652 B1 * 3/2015 Ciszewski ............... A63F 13/47
463/32

(Continued)

FOREIGN PATENT DOCUMENTS

CN    105278676 A    1/2016
CN    106237616 A    12/2016

(Continued)

OTHER PUBLICATIONS

Chinese Office Action issue in CN 201811478458.2 dated Jan. 22, 2021.

(Continued)

*Primary Examiner* — Chante E Harrison
(74) *Attorney, Agent, or Firm* — Sughrue Mion, PLLC

(57) ABSTRACT

A method for observing a virtual environment includes: displaying a first environment screen of an application program, the first environment screen comprising a virtual object in a first scene; receiving a moving operation based on which the virtual object is moved from the first scene to a second scene, the first scene and the second scene being two different scenes of the virtual environment; adjusting, according to the moving operation, a first observation manner in which the virtual environment is observed in the first environment screen to a second observation manner in which the virtual environment is observed in a second environment screen, the second environment screen comprising the virtual object in the second scene; and displaying the second environment screen of the application program.

17 Claims, 11 Drawing Sheets

(56) References Cited

U.S. PATENT DOCUMENTS

| | | | |
|---|---|---|---|
| 10,151,599 B1* | 12/2018 | Meador | G06F 30/13 |
| 10,600,245 B1* | 3/2020 | Latta | H04N 21/44029 |
| 10,726,626 B2* | 7/2020 | Palos | G06T 19/006 |
| 2011/0229054 A1* | 9/2011 | Weston | G06T 15/20 |
| | | | 382/276 |
| 2014/0200060 A1 | 7/2014 | Wu et al. | |
| 2018/0032230 A1* | 2/2018 | Inomata | G06F 3/013 |
| 2018/0075593 A1* | 3/2018 | Wang | G06T 7/85 |
| 2018/0136465 A1* | 5/2018 | Chi | G06F 3/0416 |
| 2018/0167553 A1 | 6/2018 | Yee et al. | |
| 2019/0051051 A1* | 2/2019 | Kaufman | G06F 3/01 |
| 2020/0285784 A1* | 9/2020 | Isbel | G06F 30/13 |
| 2020/0379576 A1* | 12/2020 | Chen | G06T 19/006 |

FOREIGN PATENT DOCUMENTS

| | | | |
|---|---|---|---|
| CN | 106600709 A | 4/2017 | |
| CN | 107977141 A | 5/2018 | |
| CN | 108665553 A | 10/2018 | |
| CN | 108717733 A | 10/2018 | |
| CN | 109634413 A | 4/2019 | |
| EP | 1595584 A1 | 11/2005 | |
| JP | 2016-171989 A | 9/2016 | |

OTHER PUBLICATIONS

International Search Report for PCT/CN2019/115623 dated Jan. 23, 2020 (PCT/ISA/210).
Written Opinion of the International Searching Authority dated Jan. 23, 2020 in International Application No. PCT/CN2019/115623.
Office Action dated Apr. 25, 2022 in Japanese Application No. 2021-514085.

* cited by examiner

METHOD FOR OBSERVING VIRTUAL ENVIRONMENT, DEVICE, AND STORAGE MEDIUM

CROSS-REFERENCE TO RELATED APPLICATION(S)

This application is a bypass continuation application of International Application No. PCT/CN2019/115623, filed on Nov. 5, 2019, which claims priority to Chinese Patent Application No. 201811478458.2, entitled "METHOD FOR OBSERVING VIRTUAL ENVIRONMENT, DEVICE AND STORAGE MEDIUM" and filed with the National Intellectual Property Administration, PRC on Dec. 5, 2018, the disclosures of which are herein incorporated by reference in their entireties.

FIELD

Example embodiments of the disclosure relate to the field of virtual environments, and in particular, to a method for observing a virtual environment, a device, and a storage medium.

BACKGROUND

In an intelligent terminal, an application program developed by using a virtual engine is usually installed. In the application program supporting a virtual environment, display of a display element, such as a virtual object, a virtual item, or the ground, is achieved by using a model. The virtual item includes, for example, a virtual house, a virtual water tower, a virtual hillside, virtual grassland, virtual furniture, and the like. A user may control a virtual object to conduct virtual operation (e.g., combat in a game application program) in a virtual environment.

Generally, when a virtual environment is observed, the virtual environment is observed through a camera model with a virtual object as an observation center, and the camera model is a three-dimensional model with a specific distance from the virtual object in the virtual environment and a shooting direction toward the virtual object.

However, the virtual environment usually includes different observation scenes such as a dim scene, a bright scene, an indoor scene, or an outdoor scene. When the virtual environment is observed in the foregoing observation manner, incompatibility problems of the observation manner in a plurality of observation scenes are caused. For example, in an indoor scene, the observation manner has a relatively high probability of being blocked (e.g., a line of sight of the camera model being blocked) by an indoor virtual object (e.g., virtual furniture). In a dim scene, virtual items in the virtual environment cannot be clearly presented in the observation manner. The foregoing incompatibility problems affect a virtual operation process (e.g., combat in a game application program), and a user needs to adjust an observation angle of a virtual object a plurality of times or adjust screen display brightness of a terminal whenever the observation scene changes.

SUMMARY

Embodiments of the disclosure provide a method for observing a virtual environment, a device, and a storage medium.

According to an aspect of an example embodiment, provided is a method for observing a virtual environment, performed by at least one processor of a terminal, the method including: displaying a first environment screen of an application program, the first environment screen including a virtual object in a first scene, and the first environment screen being a screen in which the virtual environment is observed in a first observation manner; receiving a moving operation based on which the virtual object is moved from the first scene to a second scene, the first scene and the second scene being two different scenes of the virtual environment; adjusting the first observation manner to a second observation manner according to the moving operation, the first observation manner corresponding to the first scene, and the second observation manner corresponding to the second scene; and displaying a second environment screen of the application program, the second environment screen including the virtual object in the second scene, and the second environment screen being a screen in which the virtual environment is observed in the second observation manner.

The adjusting may include: detecting that the virtual object is moved from an outdoor scene to an indoor scene according to the moving operation; and adjusting the first observation manner corresponding to the outdoor scene to the second observation manner corresponding to the indoor scene based on detection.

The first observation manner corresponding to the outdoor scene may include a manner in which a camera model observes the virtual environment at a first distance from the virtual object, and the second observation manner corresponding to the indoor scene may include a manner in which the camera model observes the virtual environment at a second distance from the virtual object, the camera model including a three-dimensional model observing around the virtual object in the virtual environment, and the first distance being greater than the second distance.

The first observation manner corresponding to the outdoor scene may include a manner in which a camera model observes the virtual environment from a first perspective, and the second observation manner corresponding to the indoor scene may include a manner in which the camera model observes the virtual environment from a second perspective, the camera model including a three-dimensional model observing around the virtual object, and an angle between a direction of the first perspective and a horizontal direction in the virtual environment being less than an angle between a direction of the second perspective and the horizontal direction.

The detecting may include: performing, by using a target point in the virtual object as a starting point, vertical ray detection along a vertically upward direction in the virtual environment; receiving a first detection result of the vertical ray detection, the first detection result indicating a virtual item collided with a ray in the vertically upward direction of the virtual object; and determining the first scene and the second scene according to the first detection result.

The first detection result may include an item identifier of a first virtual item that is collided with the ray during the vertical ray detection, and the determining the first scene and the second scene may include: determining, based on the item identifier, which is included in the first detection result obtained in the second scene, corresponding to an identifier of a virtual structure, that the second scene is the indoor scene; and determining, based on the item identifier, which is included in the first detection result obtained in the first scene, corresponding to another identifier other than the identifier of the virtual structure, that the first scene is the outdoor scene.

The first detection result may include a length of the ray that is collided with a first virtual item in the vertical ray detection, and the determining the first scene and the second scene may include: determining, based on the length of the ray in the first detection result obtained in the second scene being less than or equal to a preset length, that the second scene to which the virtual object is moved is the indoor scene; and determining, based on the length of the ray in the first detection result exceeding the preset length, that the first scene from which the virtual object is moved is the outdoor scene.

The detecting may include: scanning, by using a target point in the virtual object as a starting point, at least three detection rays with different directions along a horizontal direction in the virtual environment, an angle between every two detection rays being greater than a preset angle; receiving a second detection result of a horizontal ray detection using the at least three detection rays, the second detection result indicating a virtual item collided with a ray of the at least three detection rays in the horizontal direction; and determining, according to the second detection result, the first scene and the second scene.

The second detection result may include ray lengths of the at least three detection rays collided with a first virtual item, and the determining the first scene and the second scene may include: determining that the second scene is the indoor scene based on ray lengths of no less than half of the at least three detection rays not exceeding a preset length during collision with the first virtual item in the second detection result obtained in the second scene; and determining that the first scene the outdoor scene based on ray lengths of more than half of the at least three detection rays exceeding the preset length during collision with the first virtual item in the second detection result obtained in the first scene.

According to an aspect of an example embodiment, provided is an apparatus for observing a virtual environment, the apparatus including: at least one memory configured to store program code; and at least one processor configured to read the program code and operate as instructed by the program code, the program code including: display code configured to cause at least one of the at least one processor to display a first environment screen of an application program, the first environment screen including a virtual object in a first scene, and the first environment screen being a screen in which the virtual environment is observed in a first observation manner; receiving code configured to cause at least one of the at least one processor to receive a moving operation, upon which the virtual object is moved from the first scene to a second scene, the first scene and the second scene being two different observation scenes; and adjustment code configured to cause at least one of the at least one processor to adjust the first observation manner to a second observation manner according to the moving operation, the first observation manner corresponding to the first scene, and the second observation manner corresponding to the second scene, the display code being further configured to cause at least one of the at least one processor to display a second environment screen of the application program, the second environment screen including the virtual object in the second scene, and the second environment screen being a screen in which the virtual environment is observed in the second observation manner.

The adjustment code may be further configured to cause at least one of the at least one processor to: detect that the virtual object is moved from an outdoor scene to an indoor scene according to the moving operation; and adjust the first observation manner corresponding to the outdoor scene to the second observation manner corresponding to the indoor scene based on detection.

The first observation manner corresponding to the outdoor scene may include a manner in which a camera model observes the virtual environment at a first distance from the virtual object, and the second observation manner corresponding to the indoor scene may include a manner in which the camera model observes the virtual environment at a second distance from the virtual object, the camera model including a three-dimensional model observing around the virtual object in the virtual environment, and the first distance being greater than the second distance.

The first observation manner corresponding to the outdoor scene may include a manner in which a camera model observes the virtual environment from a first perspective, and the second observation manner corresponding to the indoor scene may include a manner in which the camera model observes the virtual environment from a second perspective, the camera model including a three-dimensional model observing around the virtual object, and an angle between a direction of the first perspective and a horizontal direction in the virtual environment being less than an angle between a direction of the second perspective and the horizontal direction.

The adjustment code may be further configured to cause at least one of the at least one processor to perform, by using a target point in the virtual object as a starting point, vertical ray detection along a vertically upward direction in the virtual environment; receive a first detection result of the vertical ray detection, the first detection result indicating a virtual item collided with a ray in the vertically upward direction of the virtual object; and determine the first scene and the second scene according to the first detection result.

The first detection result may include an item identifier of a first virtual item that is collided with the ray during the vertical ray detection, and the adjustment code is further configured to cause at least one of the at least one processor to: determine, based on the item identifier, which is included in the first detection result obtained in the second scene, corresponding to an identifier of a virtual structure, that the second scene is the indoor scene; and determine, based on the item identifier, which is included in the first detection result obtained in the first scene, corresponding to another identifier other than the identifier of the virtual structure, that the first scene is the outdoor scene.

The first detection result may include a length of the ray that is collided with a first virtual item in the vertical ray detection, and the adjustment code is further configured to cause at least one of the at least one processor to: determine, based on the length of the ray in the first detection result obtained in the second scene being less than or equal to a preset length, that the second scene to which the virtual object is moved is the indoor scene; and determine, based on the length of the ray in the first detection result exceeding the preset length, that the first scene from which the virtual object is moved is the outdoor scene.

The adjustment code may be further configured to cause at least one of the at least one processor to: scanning, by using a target point in the virtual object as a starting point, at least three detection rays with different directions along a horizontal direction in the virtual environment, an angle between every two detection rays being greater than a preset angle; receiving a second detection result of a horizontal ray detection using the at least three detection rays, the second detection result indicating a virtual item collided with a ray of the at least three detection rays in the horizontal direction;

and determining, according to the second detection result, the first scene and the second scene.

The second detection result may include ray lengths of the at least three detection rays collided with a first virtual item, and the adjustment code is further configured to cause at least one of the at least one processor to: determine that the second scene is the indoor scene based on ray lengths of no less than half of the at least three detection rays not exceeding a preset length during collision with the first virtual item in the second detection result obtained in the second scene; and determine that the first scene the outdoor scene based on ray lengths of more than half of the at least three detection rays exceeding the preset length during collision with the first virtual item in the second detection result obtained in the first scene.

According to an aspect of an example embodiment, provided is a terminal, including a processor and a memory, the memory storing computer-readable instructions, the computer-readable instructions, when being executed by the processor, causing the processor to perform: displaying a first environment screen of an application program, the first environment screen including a virtual object in a first scene, and the first environment screen being a screen in which the virtual environment is observed in a first observation manner; receiving a moving operation based on which the virtual object is moved from the first scene to a second scene, the first scene and the second scene being two different scenes of the virtual environment; adjusting the first observation manner to a second observation manner according to the moving operation, the first observation manner corresponding to the first scene, and the second observation manner corresponding to the second scene; and displaying a second environment screen of the application program, the second environment screen including the virtual object in the second scene, and the second environment screen being a screen in which the virtual environment is observed in the second observation manner.

According to an aspect of an example embodiment, provided is a non-transitory computer-readable storage medium, storing computer-readable instructions, wherein the computer-readable instructions are executable by one or more processors to cause the one or more processors to perform: displaying a first environment screen of an application program, the first environment screen including a virtual object in a first scene, and the first environment screen being a screen in which a virtual environment is observed in a first observation manner; receiving a moving operation based on which the virtual object is moved from the first scene to a second scene, the first scene and the second scene being two different scenes of the virtual environment; adjusting the first observation manner to a second observation manner according to the moving operation, the first observation manner corresponding to the first scene, and the second observation manner corresponding to the second scene; and displaying a second environment screen of the application program, the second environment screen including the virtual object in the second scene, and the second environment screen being a screen in which the virtual environment is observed in the second observation manner.

BRIEF DESCRIPTION OF THE DRAWINGS

To describe the technical solutions in the embodiments of the disclosure more clearly, the following briefly describes the accompanying drawings required for describing the embodiments. Apparently, the accompanying drawings in the following description show only some embodiments of the disclosure, and a person of ordinary skill in the art may still derive other accompanying drawings according to the accompanying drawings without creative efforts.

DETAILED DESCRIPTION

Figure 1:
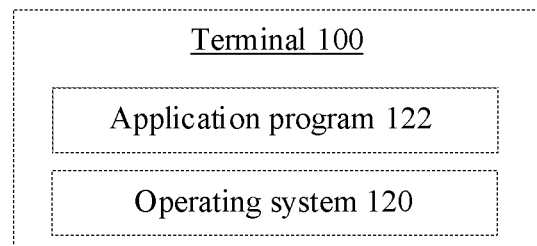
FIG. 1 is a structural block diagram of an electronic device according to an example embodiment of the disclosure.

To make the objectives, technical solutions, and advantages of the disclosure clearer, the following further describes implementations of the disclosure in detail with reference to the accompanying drawings.

First, the following explains several terms involved in the embodiments of the disclosure.

Virtual environment: a virtual environment displayed (or provided) by an application program when run on a terminal. The virtual environment may be a simulated environment of a real world, or may be a semi-simulated semi-fictional three-dimensional environment, or may be an entirely fictional three-dimensional environment. The virtual environment may be any one of a two-dimensional virtual environment, a 2.5-dimensional virtual environment, and a three-dimensional virtual environment, and while description is made by using an example in which the virtual environment is a three-dimensional virtual environment in the following embodiment, this is not limited. Optionally, the virtual environment is further used for a virtual environment battle between at least two virtual roles. Optionally, the virtual environment is further used for a battle performed between at least two virtual roles by using virtual means (e.g., virtual guns). Optionally, the virtual environment is further used for a battle performed between at least two virtual roles by using virtual guns in a range of a target region, and the range of the target region may be continuously decreased as time goes by in the virtual environment.

Virtual object: a movable object in a virtual environment. The movable object may be, for example, at least one of a virtual character, a virtual animal, or a cartoon character. In some embodiments, in a case that the virtual environment is a three-dimensional virtual environment, the virtual object is a three-dimensional model created based on a skeletal animation technology. Each virtual object has a shape and a volume in the three-dimensional virtual environment, and occupies some space in the three-dimensional virtual environment.

Observation scene: a scene corresponding to at least one observation manner of observing a virtual environment. In some embodiments, when the observation scene corresponds to at least one observation manner of observing a virtual environment by adopting a target perspective of a virtual object, the at least one observation manner remains the same in terms of a perspective type, and differs in terms of at least one parameter in an observation angle, an observation distance, and an observation configuration (for example, whether to turn on night vision equipment). When the observation scene corresponds to at least one observation manner of observing the virtual environment by adopting a target observation angle of the virtual object, the at least one observation manner remains the same in terms of an observation angle, and differs in terms of at least one parameter in an observation perspective, an observation distance, and an observation configuration. When the observation scene corresponds to at least one observation manner of observing the virtual environment by adopting a target observation distance of the virtual object, the at least one observation manner remains the same in terms of an observation distance, and differs in terms of at least one parameter in an observation perspective, an observation angle, and an observation configuration. When the observation parameter corresponds to at least one observation manner of observing the virtual environment by adopting a target observation configuration of the virtual object, the at least one observation manner remains the same in terms of an observation configuration, and differs in terms of at least one parameter in an observation perspective, an observation angle, and an observation distance. Optionally, the observation scene is a scene corresponding to a specific observation manner of observing the virtual environment. Optionally, the observation scene corresponds to a scene feature, and the observation manner corresponding to the observation scene is a manner set for the scene feature. Optionally, the scene feature includes at least one of a lighting condition feature, a scene height feature, and a feature of a virtual item concentration degree in a scene. Optionally, the observation scene in the virtual environment may be classified into a plurality of types, and a plurality of observation scenes may be implemented through superposition as a new observation scene. For example, the observation scene includes at least one of an indoor scene, an outdoor scene, a dim scene, a bright scene, a residence area scene, a mountain scene, an air-raid shelter scene, and an item stacking scene. The indoor scene may be superposed with the dim scene to implement a new dim indoor scene, for example, an unlighted room. The residence area scene may be superposed with the mountain scene to implement a new on-mountain residence area scene.

Camera model: the camera model is a three-dimensional model located around a virtual object in a virtual environment. When a first-person perspective is adopted, the camera model is located near the head of the virtual object or at the head of the virtual object. When a third-person perspective is adopted, the camera model may be located behind the virtual object and bound to the virtual object, or may be located at any position away from the virtual object by a preset distance. The virtual environment located in the virtual environment may be observed from different three-dimensional angles through the camera model. Optionally, when the third-person perspective is a first-person over-shoulder perspective, the camera model is located behind the virtual object (for example, behind the head and the shoulders of the virtual character). Optionally, the camera model is not actually displayed in the three-dimensional virtual environment, that is, the camera model cannot be recognized in the three-dimensional virtual environment displayed in the user interface.

The terminal in the disclosure may be a desktop computer, a portable laptop computer, a mobile phone, a tablet computer, an ebook reader, a moving picture experts group audio layer III (MP3) player, a moving picture experts group audio layer IV (MP4) player, or the like. An application program supporting a virtual environment is installed and run on the terminal, such as an application program supporting a three-dimensional virtual environment. The application program may be any one of a virtual reality application program, a three-dimensional map program, a military simulation program, a third-person shooting (TPS) game, an FPS game, and a multiplayer online battle arena (MOBA) game. In some embodiments, the application program may be a standalone application program, such as a standalone three-dimensional (3D) game program, or may be a network online application program.

FIG. 1 is a structural block diagram of an electronic device according to an example embodiment of the disclosure. The electronic device may be specifically a terminal 100. The terminal 100 includes an operating system 120 and an application program 122.

The operating system 120 is basic software provided for the application program 122 to perform secure access to computer hardware.

The application program 122 is an application program supporting a virtual environment. In some embodiments, the application program 122 is an application program supporting a three-dimensional virtual environment. The application program 122 may be any one of a virtual reality application program, a three-dimensional map program, a military simulation program, a third-person shooting (TPS) game, a first-person shooting (FPS) game, a MOBA game, a multiplayer shooting survival game. The application program 122 may be a standalone application program, such as a standalone 3D game program.

Figure 2:
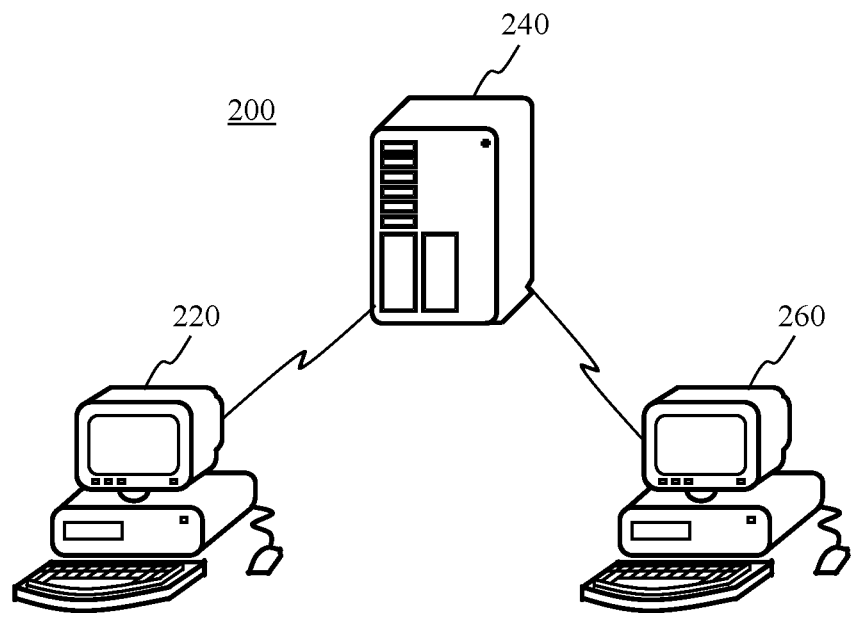
FIG. 2 is a structural block diagram of a computer system according to an example embodiment of the disclosure.

FIG. 2 is a structural block diagram of a computer system according to an example embodiment of the disclosure. The computer system 200 includes a first device 220, a server 240, and a second device 260.

An application program supporting a virtual environment is installed and run on the first device 220. The application program may be any one of a virtual reality application program, a three-dimensional map program, a military simulation program, a TPS game, an FPS game, a MOBA game, and a multiplayer shooting survival game. The first device 220 is a device used by a first user, the first user uses the first device 220 to control a first virtual object in the virtual environment to perform a movement, and the movement includes, for example but not limited to, at least one of body posture adjustment, crawling, walking, running, cycling, jumping, driving, picking, shooting, attacking, and throwing. For example, the first virtual object is a first virtual character, such as a simulated character role or a cartoon character role.

The first device 220 is connected to the server 240 by using a wireless network or a wired network.

The server 240 includes at least one of one server, a plurality of servers, a cloud computing platform, and a virtualization center. The server 240 is configured to provide background services for the application program supporting a three-dimensional virtual environment. In some embodiments, the server 240 takes on primary computing work, the first device 220 and the second device 260 take on secondary computing work; alternatively, the server 240 takes on the secondary computing work, and the first device 220 and the second device 260 take on the primary computing work; alternatively, collaborative computing is performed by using a distributed computing architecture among the server 240, the first device 220, and the second device 260.

An application program supporting a virtual environment is installed and run on the second device 260. The application program may be any one of a virtual reality application program, a three-dimensional map program, a military simulation program, an FPS game, a MOBA game, and a multiplayer shooting survival game. The second device 260 is a device used by a second user, the second user uses the second device 260 to control a second virtual object in the virtual environment to perform a movement, and the movement includes, for example but not limited to, at least one of body posture adjustment, crawling, walking, running, cycling, jumping, driving, picking, shooting, attacking, and throwing. For example, the second virtual object is a second virtual character, such as a simulated character role or a cartoon character role.

In some embodiments, the first virtual character and the second virtual character are located in the same virtual environment. In some embodiments, the first virtual character and the second virtual character may belong to the same team or the same organization, have a friend relationship, or have a temporary communication permission. In some embodiments, the first virtual character and the second virtual character may alternatively belong to different teams, different organizations, or two groups hostile to each other.

Optionally, the application programs mounted on the first device 220 and the second device 260 are the same, or the application programs installed on the two devices are the same type of application programs of different control system platforms. The first device 220 may generally refer to one of a plurality of devices, the second device 260 may generally refer to one of a plurality of devices, and in this embodiment, description is made by using only the first device 220 and the second device 260 as an example. The type of the first device 220 and the type of the second device 260 may be the same or may be different. The device type includes at least one of a game console, a desktop computer, a smartphone, a tablet computer, an ebook reader, an MP3 player, an MP4 player, and a laptop computer. In the following embodiments, description is made by using an example in which the device type of the first device 220 and the second device 260 is a desktop computer.

A person skilled in the art may learn that there may be more or fewer devices. For example, there may be only one device, or there may be dozens of or hundreds of or more devices. The quantity and the device type of the first device 220 and the second device 260 are not limited in the embodiments of the disclosure.

In some embodiments, a camera model is located at any position away from the virtual object by a preset distance. In some embodiments, one virtual object corresponds to one camera model, and the camera model may be rotated with the virtual object as a rotation center. For example, the camera model is rotated with any point of the virtual object as a rotation center. During rotation, the camera model is not only rotated in terms of an angle, but also has an offset in terms of displacement. During rotation, a distance between the camera model and the rotation center remains unchanged, that is, the camera model is rotated on a surface of a sphere with the rotation center as a sphere center. Any point of the virtual object may be the head or the torso of the virtual object, or any point on or around the virtual object. This is not limited in the embodiments of the disclosure. In some embodiments, when the camera model observes the virtual environment, the viewing angle direction of the camera model is a direction in which a vertical line on a tangent plane of a spherical surface on which the camera model is located points to the virtual object.

In some embodiments, the camera model may alternatively observe the virtual environment at a preset angle in different directions of the virtual object.

Figure 3:
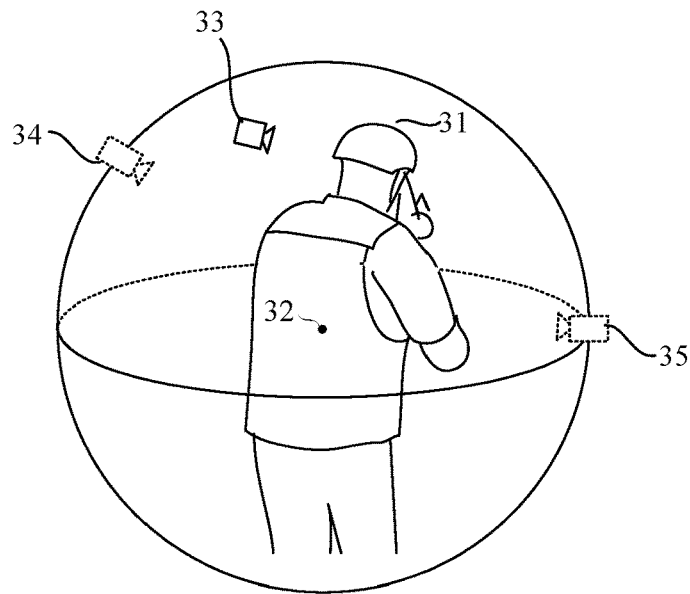
FIG. 3 is a schematic diagram of a camera model observing a virtual environment according to an example embodiment of the disclosure.

For example, referring to FIG. 3, a point in a virtual object 31 is determined as a rotation center 32, and the camera model rotates around the rotation center 32. In some embodiments, the camera model is configured with an initial position, and the initial position is a position above and behind the virtual object 31 (for example, a position behind the brain). For example, as shown in FIG. 3, the initial position is a position 33, and when the camera model rotates to a position 34 or a position 35, a viewing angle direction of the camera model changes as the camera model rotates.

Figure 4:
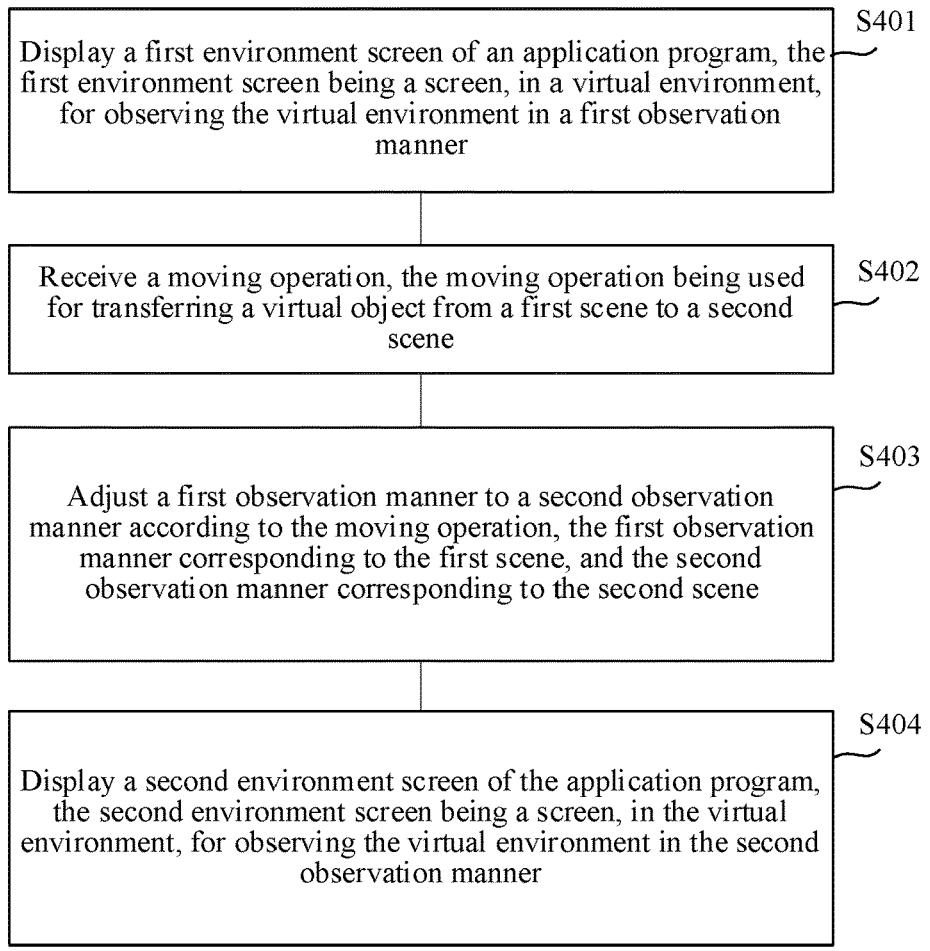
FIG. 4 is a flowchart of a method for observing a virtual environment according to an example embodiment of the disclosure.

FIG. 4 shows a method for observing a virtual environment according to an example embodiment of the disclosure. An example in which the method is applied to the terminal 100 shown in FIG. 1 is used for description. As shown in FIG. 4, the method includes the following operations S401-S404:

Operation S401. Display a first environment screen of an application program, the first environment screen being a screen, in the virtual environment, in which the virtual environment is observed in a first observation manner.

In some embodiments, the first environment screen includes a virtual object in a first scene.

In some embodiments, the virtual object in the virtual environment belongs to at least one scene. For example, a scene in the virtual environment includes at least one of an indoor scene, an outdoor scene, a dim scene, and a bright scene. The indoor scene and the outdoor scene are two independent and complementary observation scenes. For example, the virtual object is either in the indoor scene or in the outdoor scene.

In some embodiments, the first observation manner includes an observation manner corresponding to the first scene. In some embodiments, each of the observation scenes corresponds to one observation manner, and the correspondence is preset. In some embodiments, when a position in the virtual environment corresponds to two or more observation scenes, and when the virtual object is at this position, an observation manner of observing the virtual environment may be a superposition of observation manners corresponding to the two or more observation scenes, or may be one of the observation manners corresponding to the two or more observation scenes. In some embodiments, when an observation manner is selected from a plurality of observation manners, priorities may be set for different observation manners, and an observation manner with a higher priority is selected according to the priorities for observing the virtual environment at this position, or an observation manner is randomly selected from the plurality of observation manners for observing the virtual environment.

For example, the observation manner corresponding to the indoor scene is to observe the virtual environment at a position away from the virtual object by a first distance. The observation manner corresponding to the dim scene is to observe the virtual environment by using night vision equipment. When the virtual object is in the indoor and dim scene, the virtual environment may be observed, by using the night vision equipment, at a position away from the virtual object by the first distance, or the virtual environment may be observed, by only using the night vision equipment, at a position away from the virtual object by a second distance (the second distance is a default distance).

Operation S402. Receive a moving operation, the moving operation being used for transferring the virtual object from the first scene to a second scene.

In some embodiments, the first scene and the second scene are two different observation scenes.

In some embodiments, the first scene and the second scene are two independent and complementary observation scenes. For example, the virtual object is either in the first scene or in the second scene. For example, the first scene is the outdoor scene, and the second scene is the indoor scene; or the first scene is the bright scene, and the second scene is the dim scene; or the first scene is the item stacking scene, and the second scene is a wildland scene.

For example, transferring the virtual object from the first scene to the second scene according to the moving operation may be implemented as transferring the virtual object from outdoors to indoors according to the moving operation. The first scene is the outdoor scene, and the second scene is the indoor scene. In addition, the outdoor scene may also be implemented as a bright scene, the indoor scene may also be implemented as a dim scene, that is, the first scene is the bright scene, and the second scene is the dim scene.

In some embodiments, when the foregoing terminal is a mobile terminal with a touchscreen, the moving operation may be generated after a user slides on the touchscreen, or may be generated after a user presses a physical key of the mobile terminal. When the foregoing terminal is a desktop computer or a portable laptop computer, the moving operation may be a corresponding operation upon which the terminal receives a signal inputted from an external input device. For example, a user operates a mouse as a moving operation to transmit a moving signal to the terminal, or a user operates a keyboard as a moving operation to transmit a moving signal to the terminal.

Operation S403. Adjust a first observation manner to a second observation manner according to the moving operation, the first observation manner corresponding to the first scene, and the second observation manner corresponding to the second scene.

In some embodiments, a corresponding parameter in the observation manner includes at least one of an observation angle, an observation distance, whether to turn on night vision equipment, and an observation perspective.

In some embodiments, the terminal detects the observation scene in which the virtual object is located in the virtual environment every preset time. In some embodiments, a detection process includes at least one of the following cases:

First, if the first scene is the outdoor scene, and the second scene is the indoor scene, the observation scene in which the virtual object is located in the virtual environment is detected in a collision detection manner, and when it is detected that the virtual object moves from the outdoor scene to the indoor scene according to the moving operation, the first observation manner is adjusted to the second observation manner.

In some embodiments, the first observation manner is a manner in which a camera model observes the virtual environment at a first distance from the virtual object, and the second observation manner is a manner in which the camera model observes the virtual environment at a second distance from the virtual object. The camera model is a three-dimensional model observing around the virtual object in the virtual environment. The first distance is greater than the second distance, that is, a distance between the camera model and the virtual object is adjusted from the first distance to the second distance when it is detected that the virtual object moves from the outdoor scene to the indoor scene.

Figure 5:
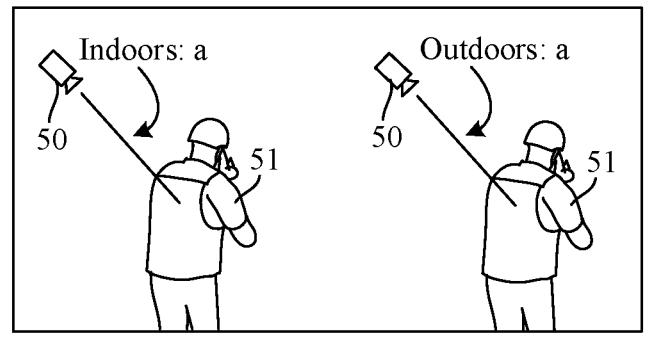
FIG. 5 is a schematic diagram of observing the virtual environment in indoor and outdoor scenes in the related art according to the embodiment shown in FIG. 4.

For example, in the related technologies, regardless of whether the virtual object is located in the outdoor scene or the indoor scene, the observation distance from which the virtual object is observed remains the same. Referring to FIG. 5, in the indoor scene, when a virtual object 51 is observed, a distance between a camera model 50 and the virtual object 51 is a, and in the outdoor scene, when the virtual object 51 is observed, a distance between the camera model 50 and the virtual object 51 is also a. The distance between the camera model 50 and the virtual object 51 may be considered as a distance between the camera model 50 and a physical central point of the virtual object 51, or may be considered as a distance between the camera model 50 and any point in the virtual object 51. When the virtual environment is observed in this manner, it is likely that a virtual item between the camera model 50 and the virtual object 51 blocks a line of sight of the camera model with which the camera model observes the virtual environment, resulting in a problem that affects the play of a virtual reality application program (e.g., a combat in a battle game).

Figure 6:
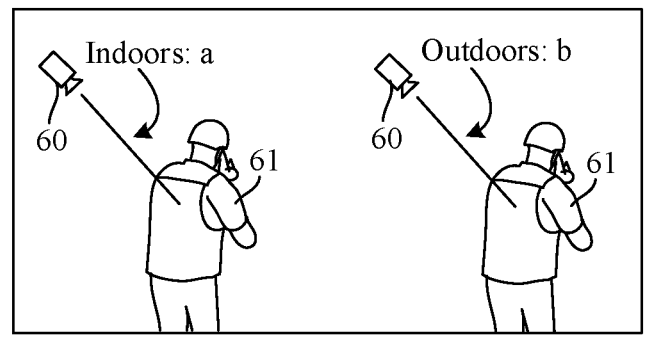
FIG. 6 is a schematic diagram of observing the virtual environment in indoor and outdoor scenes in the disclosure according to the embodiment shown in FIG. 4.

On the other hand, referring to FIG. 6 according to an example embodiment of the disclosure, in the indoor scene, when a virtual object 61 is observed, a distance between a camera model 60 and a virtual object 61 is a, and in the outdoor scene, when the virtual object 61 is observed, a distance between the camera model 60 and the virtual object 61 is a<b.

In some embodiments, the first observation manner may alternatively be a manner in which the camera model observes the virtual environment in a first perspective, and the second observation manner is a manner in which the camera model observes the virtual environment in a second perspective. An angle between a direction of the first perspective and a horizontal direction in the virtual environment is less than an angle between a direction of the second perspective and the horizontal direction, that is, an angle at which the camera model observes the virtual object is rotated from the first perspective to the second perspective according to the moving operation.

Figure 7:
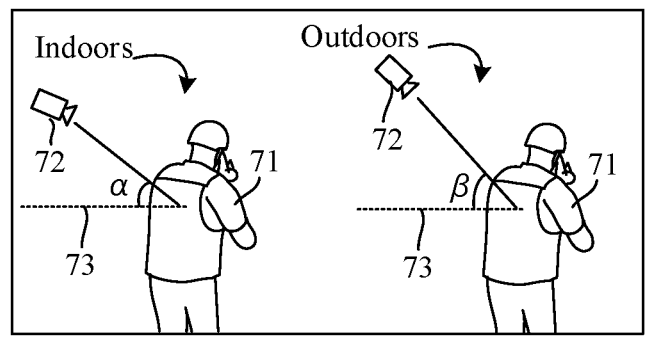
FIG. 7 is another schematic diagram of observing the virtual environment in indoor and outdoor scenes in the disclosure according to the embodiment shown in FIG. 4.

For example, referring to FIG. 7, in the indoor scene, when a virtual object 71 is observed, an angle between a camera model 70 and a horizontal direction 73 is α, and in the outdoor scene, when the virtual object 71 is observed, an angle between the camera model 70 and the virtual object 71 is β, where α<β.

In some embodiments, the first observation manner may further be a third-person observation manner, and the second observation manner is a first-person observation manner, that is, an observation perspective is converted from the third-person perspective to the first-person perspective according to the moving operation.

Second, if the first scene is the bright scene, and the second scene is the dim scene, the observation scene in which the virtual object is located in the virtual environment is detected in a color detection manner, and when it is detected that the virtual object moves from the bright scene to the dim scene according to the moving operation, the first observation manner is adjusted to the second observation manner.

In some embodiments, the first observation manner is an observation manner with night vision equipment turned off, that is, the virtual object and virtual environment are observed without using the night vision equipment, and the second observation manner is an observation manner with night vision equipment turned on, that is, the virtual environment is observed by using the night vision equipment.

In some embodiments, the color detection manner is used for detecting pixels in a display interface. When an average gray scale of the pixel is greater than a preset threshold, it is considered that the virtual object moves from the first scene to the second scene.

Third, if the first scene is the wildland scene, and the second scene is the item stacking scene, the observation scene in which the virtual object is located in the virtual environment is detected by using a scene identifier verification manner, and when it is detected that the virtual object moves from the wildland scene to the item stacking scene according to the moving operation, the first observation manner is adjusted to the second observation manner.

In some embodiments, coordinates corresponding to a position at which the virtual object is located correspond to a scene identifier, and verification is performed, according to the scene identifier, on a scene in which the virtual object is located.

In some embodiments, the first observation manner includes a manner in which the camera model observes the virtual environment at a first distance from the virtual object, and the second observation manner includes a manner in which the camera model observes the virtual environment at a second distance from the virtual object, the camera model including a three-dimensional model observing around the virtual object in the virtual environment, and the first distance being greater than the second distance. That is, a distance between the camera model and the virtual object is adjusted from the first distance to the second distance.

In some embodiments, the first observation manner may alternatively be a manner in which the camera model observes the virtual environment in a first perspective, and the second observation manner is a manner in which the camera model observes the virtual environment in a second perspective. An angle between a direction of the first perspective and a horizontal direction in the virtual environment is less than an angle between a direction of the second perspective and the horizontal direction, that is, an angle at which the camera model observes the virtual object is rotated from the first perspective to the second perspective according to the moving operation.

In some embodiments, the first observation manner may further be a third-person observation manner, and the second observation manner is a first-person observation manner, that is, an observation perspective is converted from the third-person perspective to the first-person perspective according to the moving operation.

Operation S404. Display a second environment screen of the application program, the second environment screen being a screen, in the virtual environment, for observing the virtual environment in the second observation manner.

In some embodiments, the second environment screen includes a virtual object in the second scene.

Figure 8:
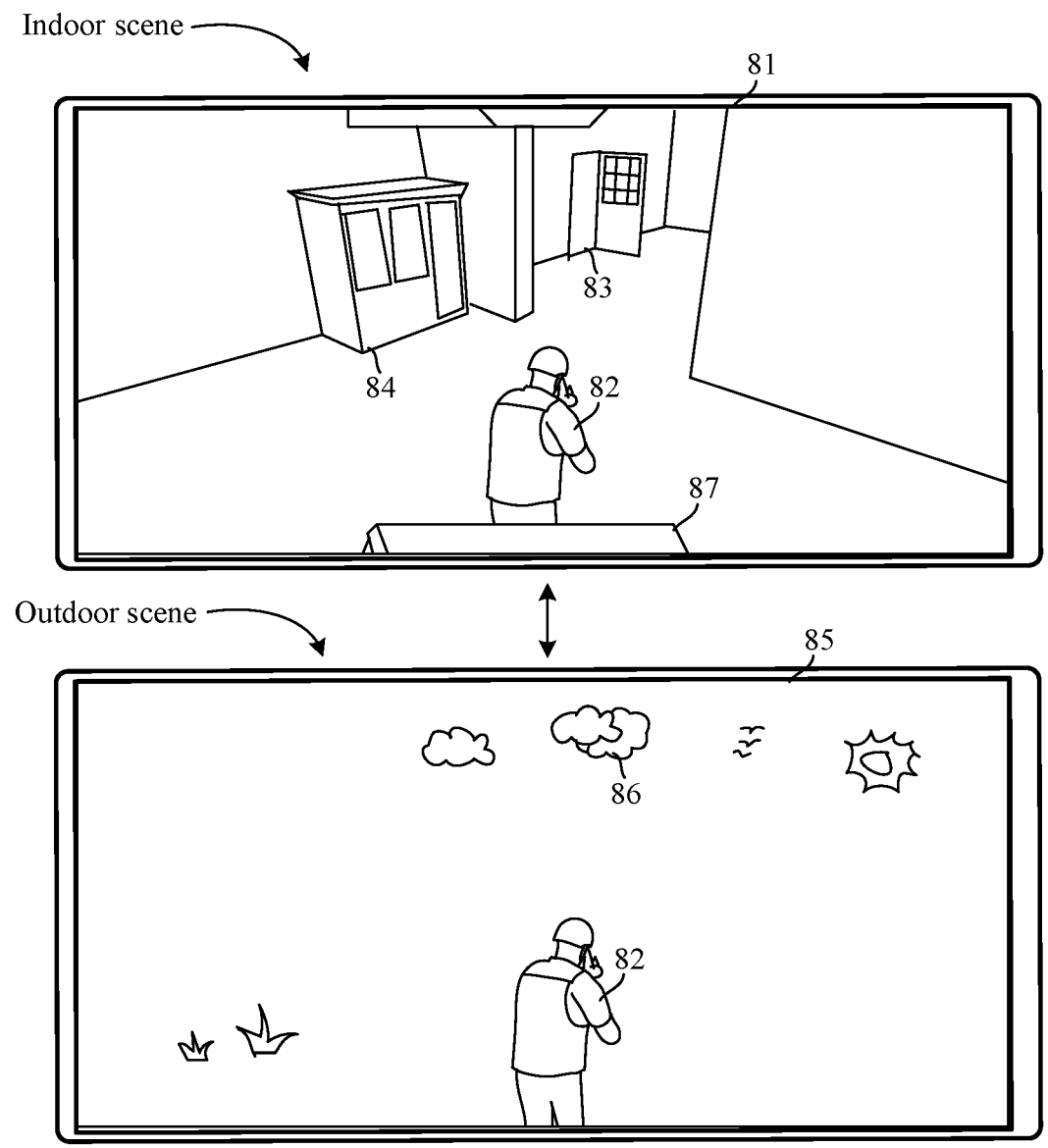
FIG. 8 is another schematic diagram of observing the virtual environment in indoor and outdoor scenes in the related art according to the embodiment shown in FIG. 4.
Figure 9:
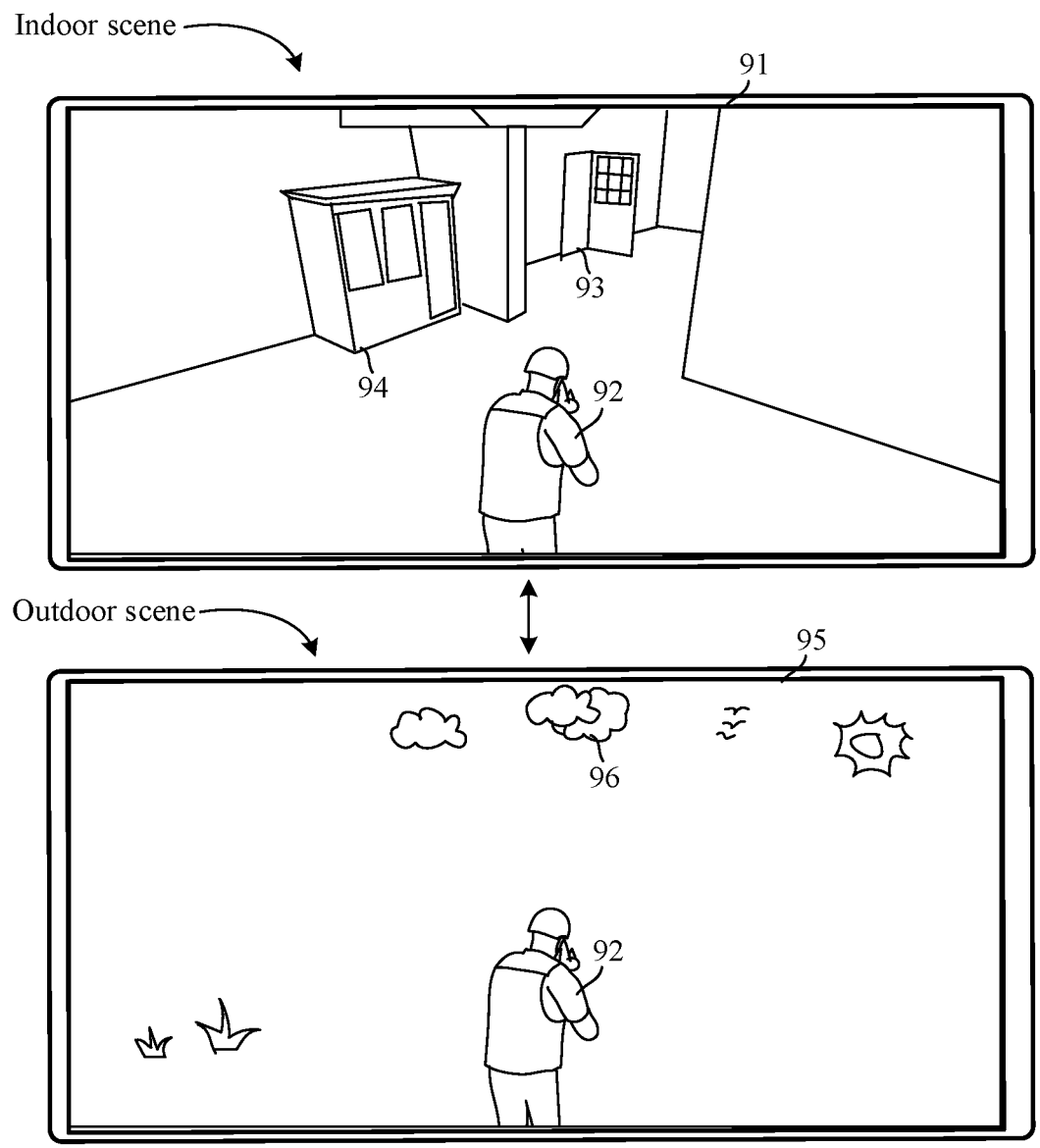
FIG. 9 is another schematic diagram of observing the virtual environment in indoor and outdoor scenes in the disclosure according to the embodiment shown in FIG. 4.

For example, with reference to an example in which the first scene is the outdoor scene, the second scene is the indoor scene, and a distance between the camera model and the virtual object is adjusted, a first environment screen and the second environment screen are described. First, in the related art, environment screens of a virtual object in an outdoor scene and an indoor scene are described. Referring to FIG. 8, in the indoor scene, a first screen 81 includes a virtual object 82, and it may be learned according to a virtual door 83 and a virtual cabinet 84 that the virtual object 82 is located in the indoor scene. However, in the outdoor scene, a second screen 85 includes the virtual object 82, and it may be learned according to a virtual cloud 86 that the virtual object 82 is located in the outdoor scene. The first screen 81 further includes a virtual item 87, and the virtual item 87 blocks a lower part of the virtual object 82. Second, both the first environment screen and the second environment screen corresponding to the solution included in the disclosure are described. As shown in FIG. 9, in the indoor scene, a first environment screen 91 includes a virtual object 92, and it may be learned according to a virtual door 93 and a virtual cabinet 94 that the virtual object 92 is located in the indoor scene. On the other hand, in the outdoor scene, a second environment screen 95 includes the virtual object 92, it may be learned according to a virtual cloud 96 that the virtual object 92 is located in the outdoor scene. In the first environment screen 91, the virtual item 87 that blocks the virtual object in the first screen 85 in FIG. 8 is not shown in the first environment screen 91 because the first environment screen 91 is generated when the camera model observes the virtual object 92 from a shorter distance. That is, the virtual item 87 does not block the virtual object 92 or a line of sight of the camera model according to an example embodiment.

According to the method for observing a virtual environment provided by this embodiment, a manner for observing a virtual object in the virtual environment is adjusted according to different observation scenes in which the virtual object is located, to observe the virtual object in the observation scene by using an observation manner adapted to the observation scene, thereby avoiding the problem in the related art that an observation manner remains undiversified such that an improper observation angle, an improper observation distance, and/or an improper observation configuration affects the play of a virtual reality application program (e.g., a combat in a battle game) when the virtual object is observed in the same observation manner in different observation scenes.

Figure 10:
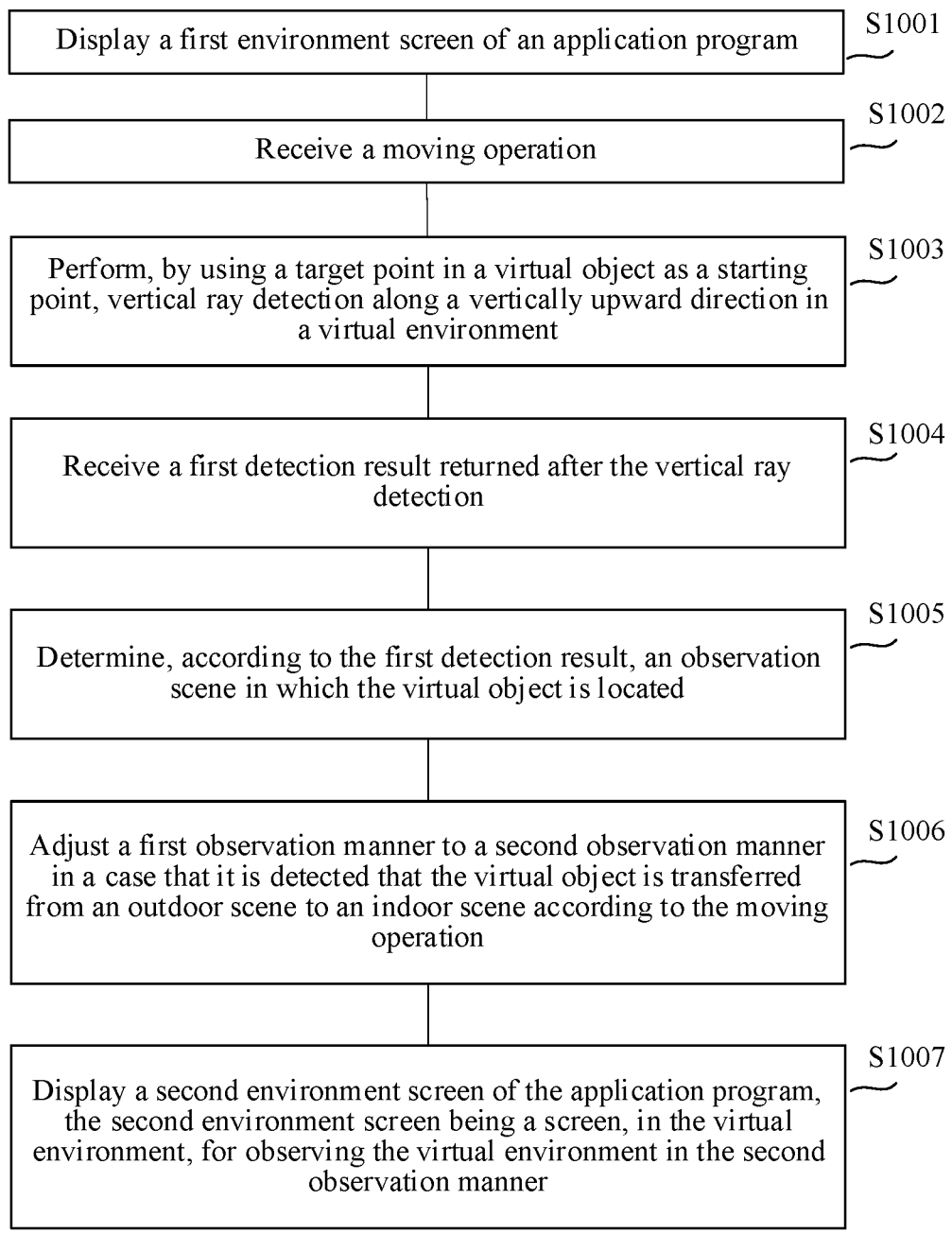
FIG. 10 is a flowchart of a method for observing a virtual environment according to another example embodiment of the disclosure.

In an optional embodiment, the first scene is the outdoor scene, and the second scene is the indoor scene. A terminal detects, in a collision detection manner, the observation scene in which the virtual object is located in the virtual environment, and the collision detection manner may include vertical ray detection. FIG. 10 shows a method for observing a virtual environment according to another example embodiment of the disclosure. An example in which the method is applied to the terminal 100 shown in FIG. 1 is used for description. As shown in FIG. 10, the method includes the following operations S1001-S1007:

Operation S1001. Display a first environment screen of an application program.

In some embodiments, the first environment screen includes a virtual object in a first scene, and the first environment screen being a screen, in the virtual environment, for observing the virtual environment in a first observation manner.

In some embodiments, the virtual object in the virtual environment belongs to at least one scene. For example, an observation scene in the virtual environment includes either of an indoor scene and an outdoor scene. The indoor scene and the outdoor scene are two independent and complementary observation scenes. For example, the virtual object is either in the indoor scene or in the outdoor scene.

Operation S1002. Receive a moving operation.

In some embodiments, the moving operation is used for transferring the virtual object from the first scene to the second scene. The first scene may be the outdoor scene, and the second scene may be the indoor scene. That is, the moving operation is used for transferring the virtual object from the outdoor scene to the indoor scene.

Operation S1003. Perform, by using a target point in the virtual object as a starting point, the vertical ray detection along a vertically upward direction in the virtual environment.

In some embodiments, the target point may be any one of a physical central point, a point corresponding to the head, a point corresponding to an arm, and a point corresponding to a leg in the virtual object, or may be any point in the virtual object, or may be any point that is outside the virtual object and that corresponds to the virtual object.

In some embodiments, in the vertical ray detection, a ray may be made in a vertically downward manner in the virtual environment.

Figure 11:
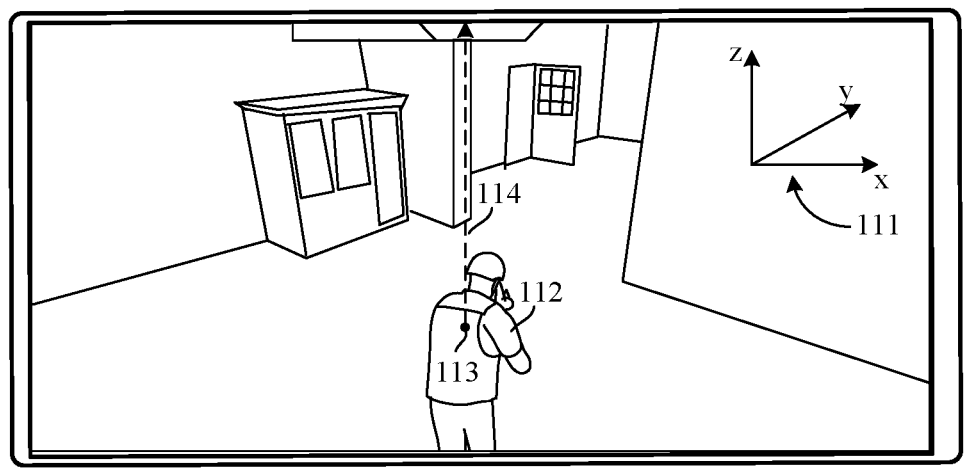
FIG. 11 is a schematic diagram of vertical ray detection according to the embodiment shown in FIG. 10.

For example, referring to FIG. 11, a coordinate system 111 is a three-dimensional coordinate system applied to the virtual environment, where a direction that a z axis points is a vertically upward direction in the virtual environment, and the terminal may make (or scan), by using a target point 113 of a virtual object 112 as a starting point, a vertical ray 114 in the vertically upward direction for detection. In FIG. 11, the vertical ray 114 is used as an example for description. In an actual application scenario, the vertical ray 114 may not be shown in the environment screen.

Operation S1004. Receive a first detection result of the vertical ray detection.

In some embodiments, the first detection result is used for representing a virtual item collided with in the vertically upward direction of the virtual object.

In some embodiments, the first detection result includes an item identifier of a first virtual item that is collided with during the vertical ray detection, and/or a length of a ray when the first virtual item is collided with during the vertical ray detection.

In some embodiments, when no virtual item is collided with in the vertical ray detection, the first detection result is empty.

Operation S1005. Determine the observation scene in which the virtual object is located according to the first detection result.

In some embodiments, determining, by the terminal, the observation scene in which the virtual object is located according to the first detection result includes any one of the following manners:

First, the first detection result includes the item identifier of the first virtual item collided with during the vertical ray detection. When the item identifier in the first detection result is a virtual house identifier (or any building identifier or structure identifier), the terminal determines that the observation scene in which the virtual object is located is the indoor scene.

In some embodiments, when the first detection result is empty, or the item identifier in the first detection result is another item identifier such as a virtual cloud identifier or a virtual tree identifier, the terminal may determine that the observation scene in which the virtual object is located is the outdoor scene, that is, when the item identifier in the first detection result is another identifier other than the virtual house identifier, the terminal determines that the observation scene in which the virtual object is located is the outdoor scene.

Figure 12:
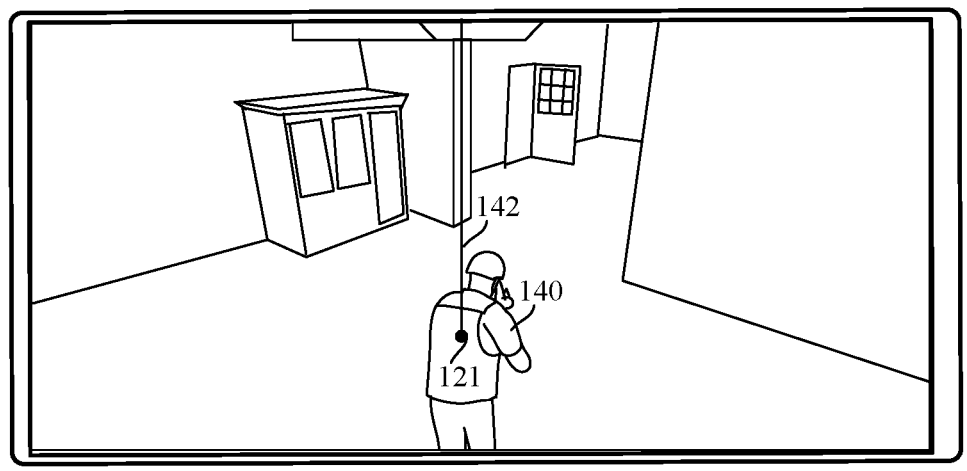
FIG. 12 is another schematic diagram of vertical ray detection according to the embodiment shown in FIG. 10.
Figure 13:
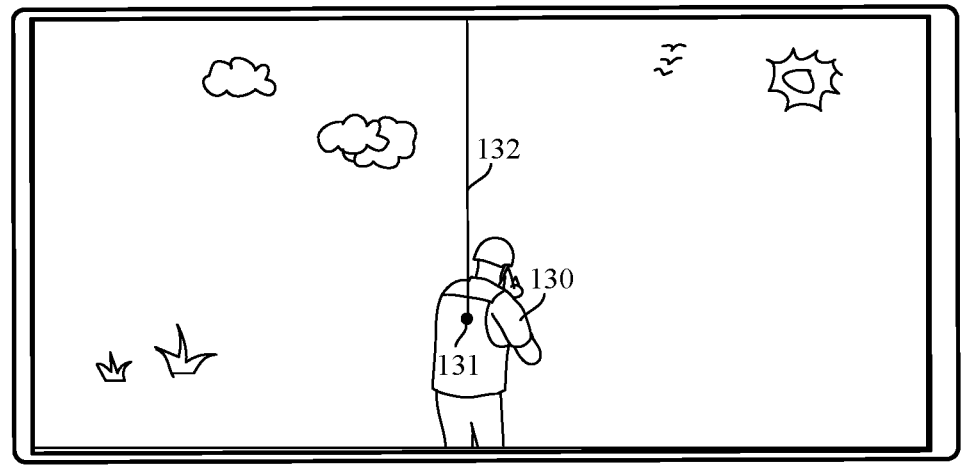
FIG. 13 is another schematic diagram of vertical ray detection according to the embodiment shown in FIG. 10.

For example, referring to FIG. 12, a virtual object 140 is located in the indoor scene, and the vertical ray detection is performed from a target point 121 of the virtual object 140 in the vertically upward direction. After a vertical ray 142 collides with a virtual house, and a house identifier is returned, the terminal determines that the virtual object 140 is located in the virtual house, that is, in the indoor scene. Referring to FIG. 13, a virtual object 130 is located in the outdoor scene, and the vertical ray detection is performed from a target point 131 of the virtual object 130 in the vertically upward direction. A vertical ray 132 does not collide with a virtual item. Therefore, after a null is returned, it is determined that the virtual object 130 is located in the outdoor scene.

The vertical ray 142 in FIG. 12 and the vertical ray 132 in FIG. 13 are both provided for schematic description, and may not exist or shown in an actual application.

Second, the first detection result includes a length of a ray when the first virtual item is collided with during the vertical ray detection. When the length of the ray in the first detection result is less than or equal to a preset length, the terminal determines that the observation scene in which the virtual object is located is the indoor scene. When the length of the ray in the first detection result exceeds the preset length, the terminal determines that the observation scene in which the virtual object is located is the outdoor scene.

For example, if the highest floor height of the house is 2 m, the preset length is 2 m. When the length of the ray in the first detection result does not exceed 2 m, the terminal may determine that the virtual object is located in the indoor scene. When the length of the ray in the first detection result exceeds 2 m, the terminal may determine that the virtual object is located in the outdoor scene.

Execution of operation 1003 to operation 1005 runs through an entire process of environment screen display, that is, for each frame of environment screen, the observation scene in which the virtual object is located is detected. For example, each second includes 30 frames of environment screens, and the terminal needs to detect the observation scene in which the virtual object is located 30 times per second.

Operation S1006. Adjust a first observation manner to a second observation manner in a case that it is detected that the virtual object is transferred from the outdoor scene to the indoor scene according to the moving operation.

The first observation manner corresponds to the first scene, and the second observation manner corresponds to the second scene.

Operation S1007. Display a second environment screen of the application program.

In some embodiments, the second environment screen includes a virtual object in a second scene, and the second environment screen is a screen, in the virtual environment, for observing the virtual environment in the second observation manner.

According to the method for observing a virtual environment provided by this embodiment, a manner for observing a virtual object in the virtual environment is adjusted according to different observation scenes in which the virtual object is located, to observe the virtual object in the observation scene by using an observation manner adapted to the observation scene, thereby preventing an undiversified observation manner, which may cause a problem that an improper observation angle, an improper observation distance, and/or an improper observation configuration affects the play of a virtual reality application program (e.g., a combat in a battle game) when the virtual object is observed in the same observation manner in different observation scenes.

In the method provided in this embodiment, the observation scene in which the virtual object is located is determined through vertical ray detection, to detect the observation scene in which the virtual object is located in a convenient and accurate manner, thereby preventing an undiversified observation manner, which may cause a problem that an improper observation angle, an improper observation distance, and/or an improper observation configuration affects the play of a virtual reality application program (e.g., a combat in a battle game) when the virtual object is observed in the same observation manner in different observation scenes.

Figure 14:
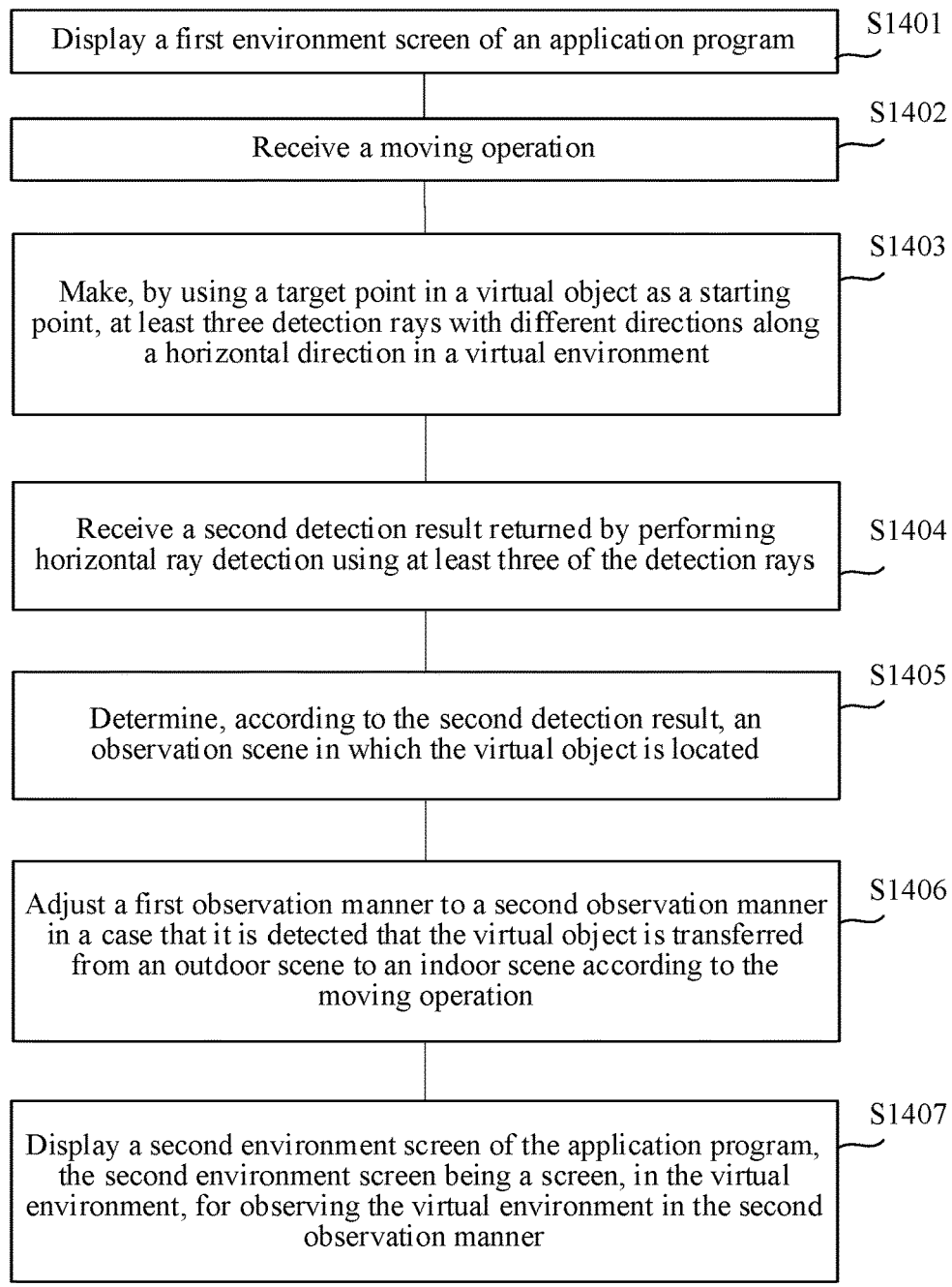
FIG. 14 is a flowchart of a method for observing a virtual environment according to another example embodiment of the disclosure.

In an optional embodiment, the first scene is the outdoor scene, and the second scene is the indoor scene. The terminal detects, in a collision detection manner, the observation scene in which the virtual object is located in the virtual environment. The collision detection manner may include horizontal ray detection. FIG. 14 shows a method for observing a virtual environment according to another example embodiment of the disclosure. An example in which the method is applied to the terminal 100 shown in FIG. 1 is used for description. As shown in FIG. 14, the method includes the following operations S1401-S1407:

Operation S1401. Display a first environment screen of an application program.

In some embodiments, the first environment screen includes a virtual object in a first scene, and the first environment screen being a screen, in the virtual environment, for observing the virtual environment in a first observation manner.

In some embodiments, the virtual object in the virtual environment belongs to at least one observation scene. For example, an observation scene in the virtual environment includes either of an indoor scene and an outdoor scene. The indoor scene and the outdoor scene are two independent and complementary observation scenes. For example, the virtual object is either in the indoor scene or in the outdoor scene.

Operation S1402. Receive a moving operation.

In some embodiments, the moving operation is used for transferring the virtual object from the first scene to the second scene. The first scene is the outdoor scene, and the second scene is the indoor scene. That is, the moving operation is used for transferring the virtual object from the outdoor scene to the indoor scene.

Operation S1403. Make (or scan), by using a target point in the virtual object as a starting point, at least three detection rays with different directions along a horizontal direction in the virtual environment.

In some embodiments, the target point may be, for example but not limited to, any one of a physical central point, a point corresponding to the head, a point corresponding to an arm, and a point corresponding to a leg in the virtual object, or may be any point in the virtual object, or may be any point that is outside the virtual object and that corresponds to the virtual object.

In some embodiments, in the at least three detection rays, an angle between every two detection rays is greater than a preset angle. For example, if the smallest angle between every two detection rays is 90°, there are at most four detection rays. When there are three detection rays, the angle between every two rays may be 120°, or two angles may be 90°, and the third angle may be 180°, or any combination of angles all being greater than or equal to 90°.

Figure 15:
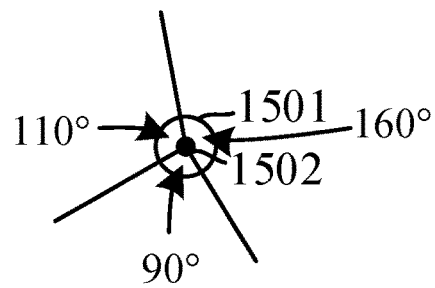
FIG. 15 is a schematic diagram of horizontal ray detection according to the embodiment shown in FIG. 14.

FIG. 15 illustrates a schematic example of a top view of a virtual object 1501. Three detection rays are used, with respect to a target point 1502 of the virtual object 1501 as a starting point, along a horizontal direction, where an angle between a first detection ray and a second detection ray is 90°, an angle between the first detection ray and a third detection ray is 110°, and an angle between the second detection ray and the third detection ray is 160°.

Operation S1404. Receive a second detection result of horizontal ray detection using at least three of the detection rays.

In some embodiments, the second detection result is used for representing a virtual item collided with by the detection ray in the horizontal direction.

Operation S1405. Determine, according to the second detection result, the observation scene in which the virtual object is located.

In some embodiments, determining, according to the second detection result, the observation scene in which the virtual object is located includes any one of the following manners:

First, the second detection result includes ray lengths in a case that at least three of the detection rays collide with the first virtual item; the terminal may determine that the virtual object is located in the indoor scene in a case that in the at least three of the detection rays, the ray lengths of no less than half of the detection rays do not exceed a preset length during collision with the first virtual item; and the terminal may determine that the observation scene in which the virtual object is located is the outdoor scene in a case that in the at least three of the detection rays, the ray lengths of more than half of the detection rays exceed a preset length during collision with the first virtual item.

Second, the second detection result includes an item identifier of the first virtual item collided with by at least three detection rays; the terminal may determine that the virtual object is located in the indoor scene in a case that in the at least three of the detection rays, the item identifier of the first virtual item collided with by no less than half of the detection rays is a house identifier (or any building or structure identifier); and the terminal may determine that the virtual object is located in the outdoor scene in a case that in the at least three of the detection rays, the item identifier of the first virtual item collided with by more than half of the detection rays is not a house identifier.

Execution of operation S1403 to operation S1405 runs through an entire process of environment screen display, that is, for each frame of environment screen, the observation scene in which the virtual object is located is detected. For example, each second includes 30 frames of environment screens, and the terminal needs to detect the observation scene in which the virtual object is located 30 times per second.

Operation S1406. Adjust a first observation manner to a second observation manner in a case that it is detected that the virtual object is transferred from the first scene to the second scene (e.g., from the outdoor scene to the indoor scene) according to the moving operation.

The first observation manner corresponds to the first scene, and the second observation manner corresponds to the second scene.

Operation S1407. Display a second environment screen of the application program.

In some embodiments, the second environment screen includes a virtual object in a second scene, and the second environment screen is a screen, in the virtual environment, for observing the virtual environment in the second observation manner.

According to the method for observing a virtual environment provided by this embodiment, a manner for observing a virtual object in the virtual environment is adjusted according to different observation scenes in which the virtual object is located, to observe the virtual object in the observation scene by using an observation manner adapted to the observation scene, thereby preventing an undiversified observation manner from causing a problem that an improper observation angle, an improper observation distance, and/or an improper observation configuration affects the play of a virtual reality application program (e.g., a combat in a battle game) when the virtual object is observed in the same observation manner in different observation scenes.

In the method provided in this embodiment, the observation scene in which the virtual object is located is determined through horizontal ray detection, to detect the observation scene in which the virtual object is located in a convenient and accurate manner, thereby preventing an undiversified observation manner from causing a problem that an improper observation angle, an improper observation distance, and/or an improper observation configuration affects the play of a virtual reality application program (e.g., a combat in a battle game) when the virtual object is observed in the same manner in different observation scenes.

Figure 16:
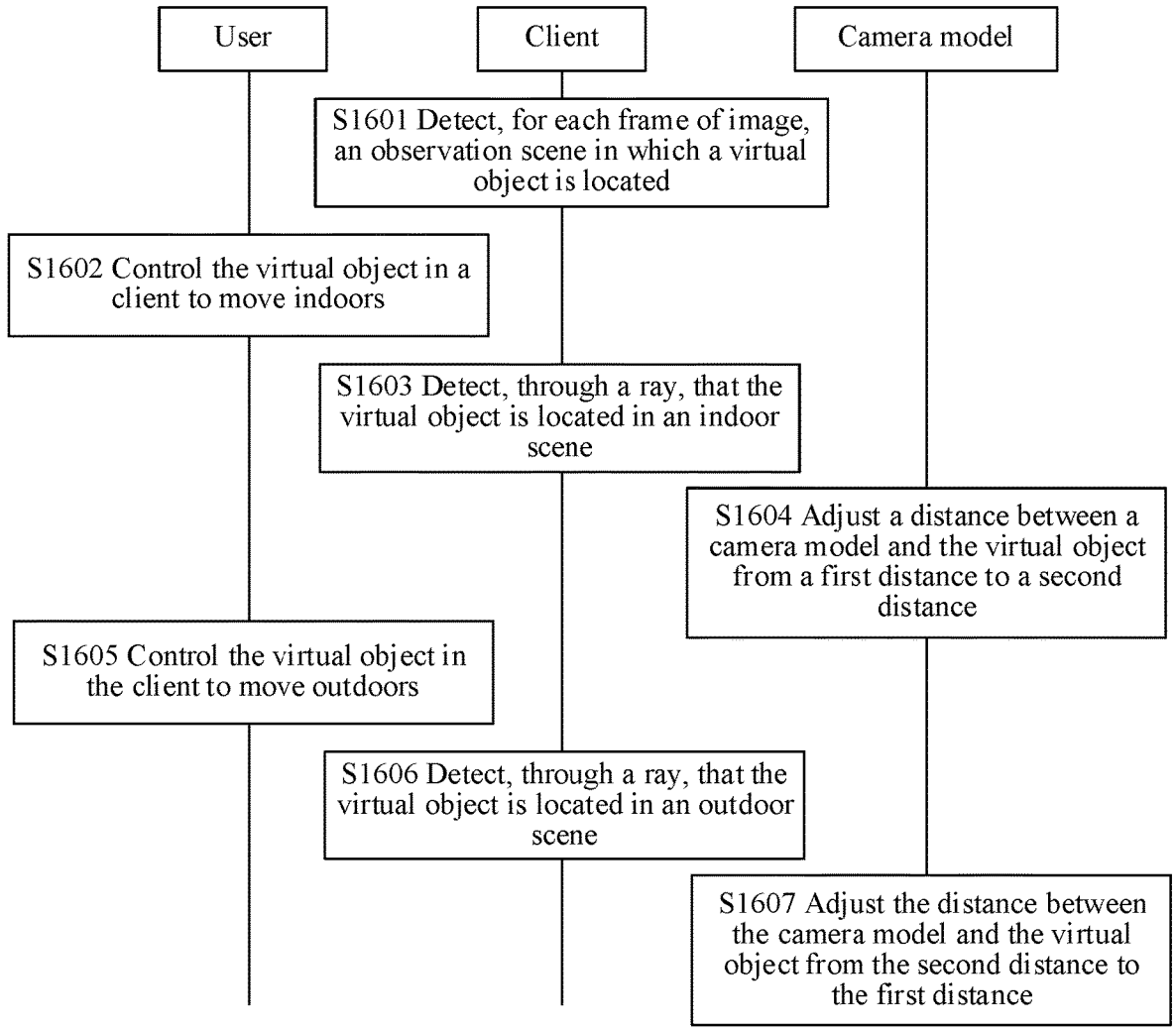
FIG. 16 is a flowchart of a method for observing a virtual environment according to another example embodiment of the disclosure.

FIG. 16 shows a method for observing a virtual environment according to another example embodiment of the disclosure. As shown in FIG. 16, the method includes the following operations S1601-S1607:

Operation S1601. A client detects, for each frame of image, an observation scene in which a virtual object is located.

For example, each second includes 30 frames of environment screens, and the terminal needs to detect the observation scene in which the virtual object is located 30 times per second.

Operation S1602. A user controls the virtual object in the client to move from a first scene to a second scene (e.g., from outdoors to indoors).

In some embodiments, a terminal receives a moving operation, the moving operation being used for controlling the virtual object to move in the virtual environment.

Operation S1603. The client detects, through a ray, that the virtual object is located in an indoor scene.

Operation S1604. Adjust a distance between a camera model and the virtual object from a first distance to a second distance.

In some embodiments, the first distance is greater than the second distance, that is, in a case that the virtual object is moved from the outdoor scene to the indoor scene, the distance between the camera model and the virtual object is reduced.

Operation S1605. The user controls the virtual object in the client to move outdoors.

Operation S1606. The client detects, through a ray, that the virtual object is located in the outdoor scene.

Operation S1607. Adjust the distance between the camera model and the virtual object from the second distance to the first distance.

According to the method for observing a virtual environment provided by this embodiment, a manner for observing a virtual object in the virtual environment is adjusted according to different observation scenes in which the virtual object is located, to observe the virtual object in the observation scene by using an observation manner adapted to the observation scene, thereby preventing an undiversified observation manner from causing a problem that an improper observation angle, an improper observation distance, and/or an improper observation configuration affects the play of a virtual reality application program (e.g., a combat in a battle game) when the virtual object is observed in the same observation manner in different observation scenes.

In the method provided in this embodiment, in a case that the virtual object is located in the indoor scene, a distance between the camera model and the virtual object is reduced, to reduce the possibility that a virtual item blocks a line of sight of the camera model.

Figure 17:
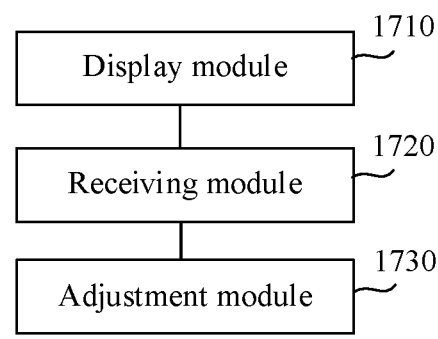
FIG. 17 is a structural block diagram of an apparatus for observing a virtual environment according to an example embodiment of the disclosure.

FIG. 17 is a structural block diagram of an apparatus for observing a virtual environment according to an example embodiment of the disclosure, the apparatus may be implemented in the terminal 100 shown in FIG. 1, the apparatus includes:

a display module 1710, configured to display a first environment screen of an application program, the first environment screen including a virtual object in a first scene, and the first environment screen being a screen, in the virtual environment, in which the virtual environment is observed in a first observation manner;

a receiving module 1720, configured to receive a moving operation, the moving operation being used for transferring the virtual object from the first scene to a second scene, the first scene and the second scene being two different observation scenes, the observation scene corresponding to at least one observation manner of observing the virtual environment;

an adjustment module 1730, configured to adjust a first observation manner to a second observation manner according to the moving operation, the first observation manner corresponding to the first scene, and the second observation manner corresponding to the second scene; and a display module 1710, further configured to display a second environment screen of the application program, the second environment screen including a virtual object in a second scene, and the second environment screen being a screen, in the virtual environment, in which the virtual environment is observed in the second observation manner.

Figure 18:
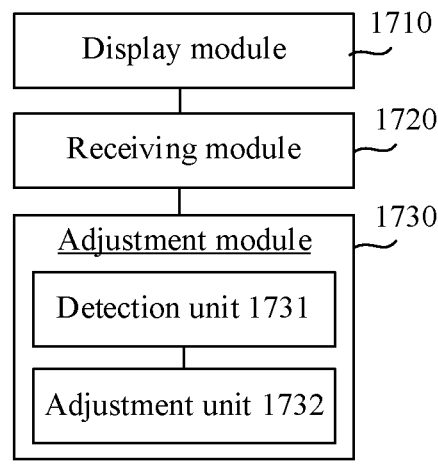
FIG. 18 is a structural block diagram of an apparatus for observing a virtual environment according to another example embodiment of the disclosure.

In an optional embodiment, as shown in FIG. 18, the first scene includes the outdoor scene, the second scene includes the indoor scene, and the adjustment module 1730 includes:

a detection unit 1731, configured to detect, in a collision detection manner, the observation scene in which the virtual object is located in the virtual environment; and an adjustment unit 1732, configured to adjust a first observation manner to a second observation manner in a case that it is detected that the virtual object is transferred from the outdoor scene to the indoor scene according to the moving operation.

In an optional embodiment, the first observation manner includes a manner in which the camera model observes the virtual environment at a first distance from the virtual object, and the second observation manner includes a manner in which the camera model observes the virtual environment at a second distance from the virtual object, the camera model including a three-dimensional model observing around the virtual object in the virtual environment, and the first distance being greater than the second distance. The adjustment unit 1732 is further configured to adjust a distance between the camera model and the virtual object from the first distance to the second distance according to the virtual object moving from the first scene (e.g., outdoor scene) to the second scene (e.g., indoor scene).

In an optional embodiment, the first observation manner includes a manner in which the camera model observes the virtual environment in a first perspective, and the second observation manner includes a manner in which the camera model observes the virtual environment in a second perspective. The camera model includes a three-dimensional model observing around the virtual object, where an angle between a direction of the first perspective and a horizontal direction in the virtual environment is less than an angle between a direction of the second perspective and the horizontal direction, and an adjustment unit 1732 is further configured to rotate, according to the moving operation, an angle at which the camera model observes the virtual object from the first perspective to the second perspective.

In an optional embodiment, the collision detection manner includes vertical ray detection. The detection unit 1731 is further configured to perform, by using a target point in the virtual object as a starting point, the vertical ray detection along a vertically upward direction in the virtual environment; receive a first detection result of the vertical ray detection, the first detection result being used for representing a virtual item collided with in the vertically upward direction of the virtual object; and determine the observation scene in which the virtual object is located according to the first detection result.

In an optional embodiment, the first detection result includes the item identifier of the first virtual item collided with during the vertical ray detection. The detection unit 1731 is further configured to determine, in a case that the item identifier in the first detection result is a virtual house identifier (or any building or structure identifier), that the observation scene in which the virtual object is located is the indoor scene; and the detection unit 1731 is further configured to determine, in a case that the item identifier in the first detection result is another identifier other than the virtual house identifier, that the observation scene in which the virtual object is located is the outdoor scene.

In an optional embodiment, the first detection result includes a length of a ray in a case that the first virtual item is collided with during the vertical ray detection. The detection unit 1731 is further configured to determine, in a case that the length of the ray in the first detection result is less than or equal to a preset length, that the observation scene in which the virtual object is located is the indoor scene; and the detection unit 1731 is further configured to determine, in a case that the length of the ray in the first detection result exceeds the preset length, that the observation scene in which the virtual object is located is the outdoor scene.

In an optional embodiment, the collision detection manner includes horizontal ray detection. The detection unit 1731 is further configured to make (or scan), by using a target point in the virtual object as a starting point, at least three detection rays with different directions along the horizontal direction in the virtual environment, an angle between every two detection rays being greater than a preset angle; receive a second detection result of the horizontal ray detection using at least three detection rays, the second detection result being used for representing a virtual item collided with by the detection ray in the horizontal direction; and determine, according to the second detection result, the observation scene in which the virtual object is located.

In an optional embodiment, the second detection result includes ray lengths in a case that at least three detection rays collide with the first virtual item; the detection unit 1731 is further configured to determine that the virtual object is located in the indoor scene in a case that in the at least three detection rays, the ray lengths of no less than half of these at least three detection rays do not exceed a preset length during collision with the first virtual item; the detection unit 1731 is further configured to determine that the virtual object is located in the outdoor scene in a case that in the at least three detection rays, the ray lengths of more than half of these at least three detection rays exceed a preset length during collision with the first virtual item.

The receiving module 1720 and the adjustment module 1730 in the foregoing embodiments may be implemented by a processor, or may be implemented by a processor and a memory in cooperation. The display module 1710 in the foregoing embodiments may be implemented by a display screen, or may be implemented by a processor and a display screen in cooperation.

Figure 19:
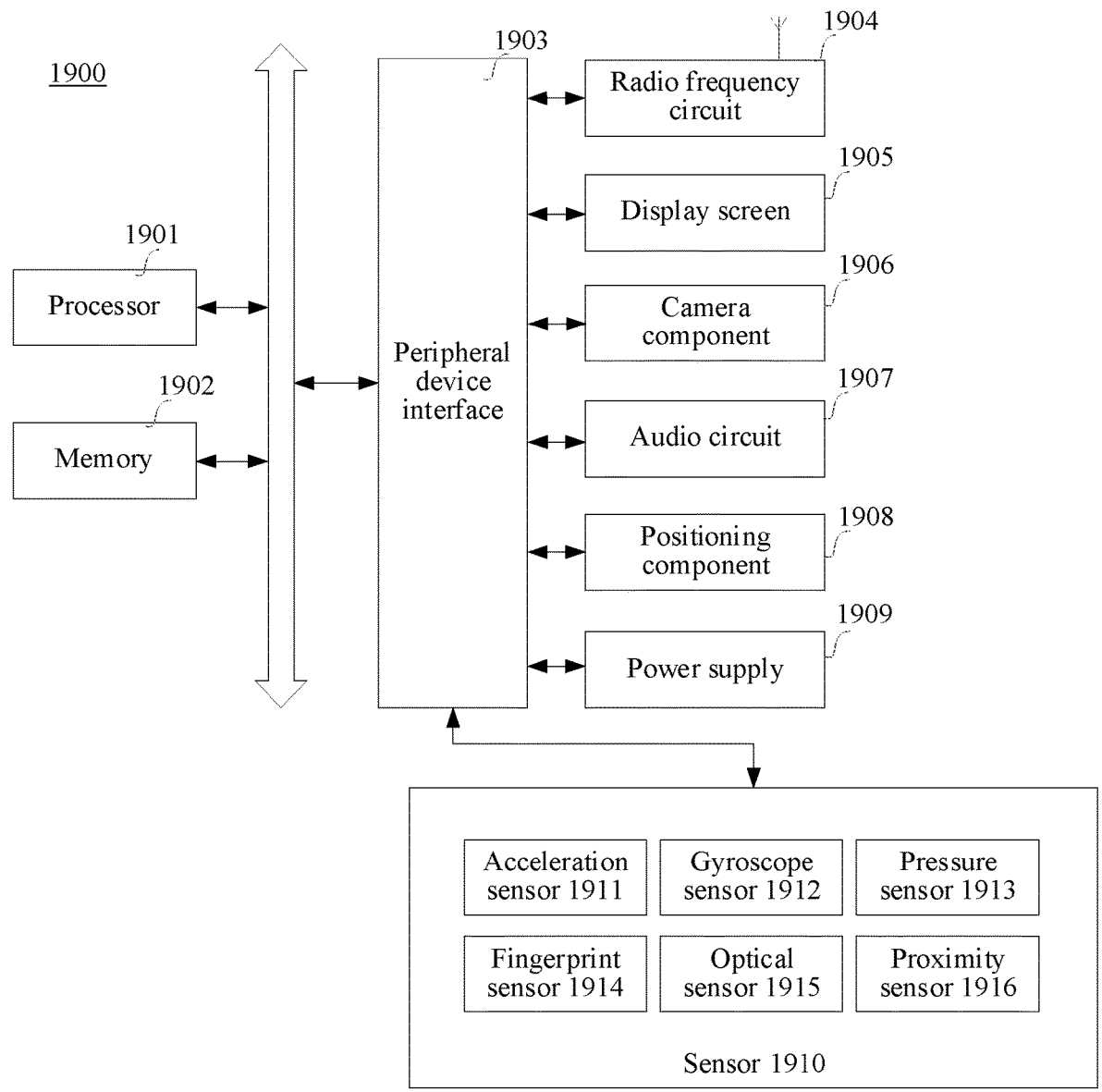
FIG. 19 is a structural block diagram of a terminal according to an example embodiment of the disclosure.

FIG. 19 is a structural block diagram of a terminal 1900 according to an example embodiment of the disclosure. The terminal 1900 may be a smartphone, a tablet computer, an MP3 player, an MP4 player, a notebook computer, or a desktop computer. The terminal 1900 may also be referred to as a user equipment, a portable terminal, a laptop terminal, a desktop terminal, or another name.

Generally, the terminal 1900 includes a processor 1901 and a memory 1902.

The processor 1901 may include one or more processing cores, for example, may be a 4-core processor or an 8-core processor. The processor 1901 may be implemented by using at least one hardware form of a digital signal processor (DSP), a field-programmable gate array (FPGA), and a programmable logic array (PLA). The processor 1901 may alternatively include a main processor and a coprocessor. The main processor is a processor configured to process data in an awake state, also referred to as a central processing unit (CPU), and the coprocessor is a low-power processor configured to process data in an idle state. In some embodiments, a graphics processing unit (GPU) may be integrated into the processor 1901. The GPU is configured to be responsible for rendering and drawing content to be displayed on a display screen. In some embodiments, the processor 1901 may further include an artificial intelligence (AI) processor. The AI processor is configured to process a computing operation related to machine learning.

The memory 1902 may include one or more computer-readable storage media. The computer-readable storage medium may be non-transient (or non-transitory). The memory 1902 may further include a high-speed random access memory and a non-transitory memory, for example, one or more magnetic disk storage devices or flash storage devices. In some embodiments, the non-transitory computer-readable storage medium in the memory 1902 is configured to store at least one instruction, and the at least one instruction being configured to be executed by the processor 1901 to implement the method for observing a virtual environment provided in the method embodiments of the disclosure.

In some embodiments, the terminal 1900 may alternatively include: a peripheral device interface 1903 and at least one peripheral device. The processor 1901, the memory 1902, and the peripheral device interface 1903 may be connected through a bus or a signal cable. Each peripheral device may be connected to the peripheral device interface 1903 through a bus, a signal cable, or a circuit board. Specifically, the peripheral device includes at least one of a radio frequency circuit 1904, a touchscreen 1905, a camera 1906, an audio circuit 1907, a positioning component 1908, and a power supply 1909.

The peripheral device interface 1903 may be configured to connect the at least one peripheral device related to input/output (I/O) to the processor 1901 and the memory 1902. In some embodiments, the processor 1901, the memory 1902, and the peripheral device interface 1903 are integrated on a same chip or circuit board. In some other embodiments, any one or two of the processor 1901, the memory 1902, and the peripheral device interface 1903 may be implemented on a separate chip or the circuit board. This is not limited in this embodiment.

The radio frequency circuit 1904 is configured to receive and transmit a radio frequency (RF) signal, also referred to as an electromagnetic signal. The RF circuit 1904 communicates with a communication network and another communication device by using the electromagnetic signal. The RF circuit 1904 converts an electric signal into an electromagnetic signal for transmission, or converts a received electromagnetic signal into an electric signal. In some embodiments, the RF circuit 1904 includes: an antenna system, an RF transceiver, one or more amplifiers, a tuner, an oscillator, a digital signal processor, a codec chip set, a subscriber identity module card, and the like. The RF circuit 1904 may communicate with other terminals through at least one wireless communication protocol. The wireless communication protocol includes, for example but not limited to a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1904 may further include a circuit related to a near field communication (NFC) related circuit. This is not limited in the disclosure.

The display screen 1905 is configured to display a user interface (UI). The UI may include a graphic, a text, an icon, a video, and any combination thereof. When the display screen 1905 is a touchscreen, the display screen 1905 may be further used to collect a touch signal on or above a surface of the display screen 1905. The touch signal may be inputted into the processor 1901 as a control signal for processing. In this case, the display screen 1905 may be further configured to provide a virtual button and/or a virtual keyboard, also referred to as a soft button and/or a soft keyboard. In some embodiments, there is one display screen 1905, disposed on a front panel of the terminal 1900. In some other embodiments, there may be two display screens 1905, respectively disposed on different surfaces of the terminal 1900 or designed in a foldable shape. In still some other embodiments, the display screen 1905 may be a flexible display screen, disposed on a curved surface or a folded surface of the terminal 1900. Even, the display screen 1905 may be further set to have a non-rectangular irregular graph, that is, a special-shaped screen. The display screen 1905 may be manufactured by using a material such as a liquid crystal display (LCD), an organic light-emitting diode (OLED), or the like.

The camera component 1906 is configured to acquire an image or a video. In some embodiments, the camera component 1906 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a background blurring function through fusion of two or more from the main camera and the depth of field camera, panoramic photo shooting and virtual reality (VR) shooting functions through fusion of the main camera and wide-angle camera, or another fusion shooting function. In some embodiments, the camera component 1906 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1907 may include a microphone and a speaker. The microphone is configured to collect sound waves of a user and an environment, and convert the sound waves into electrical signals and input the electrical signals into the processor 1901 for processing, or input the electrical signals into the RF circuit 1904 to implement speech communication. For the purpose of stereo collection or noise reduction, there may be a plurality of microphones, disposed at different portions of the terminal 1900 respectively. The microphone may be further an array microphone or an omni-directional collection type microphone. The speaker is configured to convert electrical signals from the processor 1901 or the RF circuit 1904 into sound waves. The speaker may be a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging and the like. In some embodiments, the audio circuit 1907 may further include an earphone jack.

The positioning component 1908 is configured to position a current geographic location of the terminal 1900, to implement a navigation or a location based service (LBS). The positioning component 1908 may be a positioning component based on the global positioning system (GPS) of the United States, the BeiDou system of China, and the GALILEO system of the European Union.

The power supply 1909 is configured to supply power to components in the terminal 1900. The power supply 1909 may be an alternating current, a direct current, a primary battery, or a rechargeable battery. When the power supply 1909 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 1900 further includes one or more sensors 1910. The one or more sensors 1910 include, for example but are not limited to, an acceleration sensor 1911, a gyroscope sensor 1912, a pressure sensor 1913, a fingerprint sensor 1914, an optical sensor 1915, and a proximity sensor 1916.

The acceleration sensor 1911 may detect acceleration on three coordinate axes of a coordinate system established by the terminal 1900. For example, the acceleration sensor 1911 may be configured to detect components of gravity acceleration on the three coordinate axes. The processor 1901 may control, according to a gravity acceleration signal collected by the acceleration sensor 1911, the touchscreen 1905 to display the user interface in a transverse view or a longitudinal view. The acceleration sensor 1911 may be further configured to collect motion data of a game or a user.

The gyroscope sensor 1912 may detect a body direction and a rotation angle of the terminal 1900. The gyroscope sensor 1912 may cooperate with the acceleration sensor 1911 to collect a 3D action by the user on the terminal 1900. The processor 1901 may implement the following functions according to the data collected by the gyroscope sensor 1912: motion sensing (such as changing the UI according to a tilt operation of the user), image stabilization at shooting, game control, and inertial navigation.

The pressure sensor 1913 may be disposed at a side frame of the terminal 1900 and/or a lower layer of the touchscreen 1905. When the pressure sensor 1913 is disposed on the side frame of the terminal 1900, a holding signal of the user on the terminal 1900 may be detected. The processor 1901 performs left and right hand recognition or a quick operation according to the holding signal collected by the pressure sensor 1913. When the pressure sensor 1913 is disposed on the low layer of the touchscreen 1905, the processor 1901 controls, according to a pressure operation of the user on the touchscreen 1905, an operable control on the UI. The operable control includes at least one of a button control, a scroll bar control, an icon control, and a menu control.

The fingerprint sensor 1914 is configured to collect a fingerprint of the user. The processor 1901 identifies an identity of the user according to the fingerprint collected by the fingerprint sensor 1914, or the fingerprint sensor 1914 identifies an identity of the user according to the collected fingerprint. When the identity of the user is identified as a trusted identity, the processor 1901 authorizes the user to perform a related sensitive operation. The sensitive operation includes unlocking a screen, viewing encrypted information, downloading software, payment, changing settings, and the like. The fingerprint sensor 1914 may be disposed on a front face, a back face, or a side face of the terminal 1900. When a physical button or a vendor logo is disposed on the terminal 1900, the fingerprint sensor 1914 may be integrated with the physical button or the vendor logo.

The optical sensor 1915 is configured to collect ambient light intensity. In an embodiment, the processor 1901 may control display luminance of the touchscreen 1905 according to the ambient light intensity collected by the optical sensor 1915. Specifically, when the ambient light intensity is relatively high, the display luminance of the touchscreen 1905 is increased. When the ambient light intensity is relatively low, the display luminance of the touchscreen 1905 is reduced. In another embodiment, the processor 1901 may further dynamically adjust a shooting parameter of the camera component 1906 according to the ambient light intensity collected by the optical sensor 1915.

The proximity sensor 1916, also referred to as a distance sensor, is generally disposed on the front panel of the terminal 1900. The proximity sensor 1916 is configured to collect a distance between the user and the front surface of the terminal 1900. In an embodiment, when the proximity sensor 1916 detects that the distance between the user and the front surface of the terminal 1900 gradually becomes smaller, the touchscreen 1905 is controlled by the processor 1901 to switch from a screen-on state to a screen-off state. In a case that the proximity sensor 1916 detects that the distance between the user and the front surface of the terminal 1900 gradually becomes larger, the touchscreen 1905 is controlled by the processor 1901 to switch from the screen-off state to the screen-on state.

A person skilled in the art would understand that the structure shown in FIG. 19 does not constitute a limitation to the terminal 1900, and the terminal 1900 may include more or fewer components than those shown in the figure, or some components may be combined, or a different component arrangement may be used.

Embodiments of the disclosure further provide a terminal configured to observe a virtual environment, the terminal including a processor and a memory, the memory storing computer-readable instructions, and the computer-readable instructions, when being executed by the processor, causing the processor to perform the operations in the foregoing method for observing the virtual environment. Herein, the operations of the method for observing the virtual environment may be the operations of the method for observing the virtual environment in the foregoing embodiments.

Embodiments of the disclosure further provide a computer-readable storage medium, storing computer-readable instructions, and the computer-readable instructions, when being executed by the processor, causing a processor to perform the operations in the foregoing method for observing the virtual environment. Herein, the operations of the method for observing the virtual environment may be the operations of the method for observing the virtual environment in the foregoing embodiments.

A person of ordinary skill in the art would understand that all or a part of the operations of the methods in the embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not assembled in a terminal. The computer-readable storage medium stores at least one instruction, at least one program, and a code set or an instruction set, the at least one instruction, the at least one program, and the code set or the instruction set being loaded and executed by the processor to implement the method for observing the virtual environment according to any one of FIG. 4, FIG. 10, and FIG. 14 to FIG. 16.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of the disclosure are merely for description purpose, and are not intended to indicate priorities of the embodiments.

A person of ordinary skill in the art would understand that all or some of the operations of the embodiments may be implemented by hardware or a program instructing related hardware. The program may be stored in a computer-readable storage medium. The storage medium may be: a read-only memory, a magnetic disk, or an optical disc.

The foregoing descriptions are merely example embodiments of the disclosure, but are not intended to limit the disclosure. Any modification, equivalent replacement, or improvement made within the spirit and principle of the disclosure shall fall within the protection scope of the disclosure.

What is claimed is:

1. A method for observing a virtual environment, performed by at least one processor of a terminal, the method comprising:
    displaying a first environment screen of an application program, the first environment screen comprising a virtual object in a first scene, and the first environment screen being a screen in which the virtual environment is observed in a first observation manner;
    receiving a moving operation based on which the virtual object is moved from the first scene to a second scene;
    detecting whether the virtual object is moved from an outdoor scene to an indoor scene according to the moving operation by:
        scanning, by using a target point in the virtual object as a starting point, one or more rays along a vertically upward direction and/or a horizontal direction in the virtual environment;
        detecting whether the virtual object is in the outdoor scene or the indoor scene according to a result of the scanning;
    adjusting the first observation manner to a second observation manner according to the moving operation, the first observation manner corresponding to the outdoor scene, and the second observation manner corresponding to the indoor scene; and
    displaying a second environment screen of the application program, the second environment screen comprising the virtual object in the second scene, and the second environment screen being a screen in which the virtual environment is observed in the second observation manner.

2. The method according to claim 1, wherein the first observation manner corresponding to the outdoor scene comprises a manner in which a camera model observes the virtual environment at a first distance from the virtual object, and the second observation manner corresponding to the indoor scene comprises a manner in which the camera model observes the virtual environment at a second distance from the virtual object, the camera model comprising a three-dimensional model observing around the virtual object in the virtual environment, and the first distance being greater than the second distance.

3. The method according to claim 1, wherein the first observation manner corresponding to the outdoor scene comprises a manner in which a camera model observes the virtual environment from a first perspective, and the second observation manner corresponding to the indoor scene comprises a manner in which the camera model observes the virtual environment from a second perspective, the camera model comprising a three-dimensional model observing around the virtual object, and an angle between a direction of the first perspective and a the horizontal direction in the virtual environment being less than an angle between a direction of the second perspective and the horizontal direction.

4. The method according to claim 1, wherein the detecting further comprises:
    performing, by using the target point in the virtual object as the starting point, vertical ray detection along the vertically upward direction in the virtual environment;
    receiving a first detection result of the vertical ray detection, the first detection result indicating a virtual item collided with a ray in the vertically upward direction of the virtual object; and
    determining the first scene and the second scene according to the first detection result.

5. The method according to claim 4, wherein the first detection result comprises an item identifier of a first virtual item that is collided with the ray during the vertical ray detection, and
    the determining the first scene and the second scene comprises:
    determining, based on the item identifier, which is included in the first detection result obtained in the second scene, corresponding to an identifier of a virtual structure, that the second scene is the indoor scene; and
    determining, based on the item identifier, which is included in the first detection result obtained in the first scene, corresponding to another identifier other than the identifier of the virtual structure, that the first scene is the outdoor scene.

6. The method according to claim 4, wherein the first detection result comprises a length of the ray that is collided with a first virtual item in the vertical ray detection, and
    the determining the first scene and the second scene comprises:
    determining, based on the length of the ray in the first detection result obtained in the second scene being less than or equal to a preset length, that the second scene to which the virtual object is moved is the indoor scene; and
    determining, based on the length of the ray in the first detection result exceeding the preset length, that the first scene from which the virtual object is moved is the outdoor scene.

7. The method according to claim 1, wherein the detecting comprises:
    scanning, by using the target point in the virtual object as the starting point, at least three detection rays with different directions along the horizontal direction in the virtual environment, an angle between every two detection rays being greater than a preset angle;
    receiving a second detection result of a horizontal ray detection using the at least three detection rays, the second detection result indicating a virtual item collided with a ray of the at least three detection rays in the horizontal direction; and
    determining, according to the second detection result, the first scene and the second scene.

8. The method according to claim 7, wherein the second detection result comprises ray lengths of the at least three detection rays collided with a first virtual item, and
    the determining the first scene and the second scene comprises:
    determining that the second scene is the indoor scene based on ray lengths of no less than half of the at least three detection rays not exceeding a preset length during collision with the first virtual item in the second detection result obtained in the second scene; and determining that the first scene the outdoor scene based on ray lengths of more than half of the at least three detection rays exceeding the preset length during collision with the first virtual item in the second detection result obtained in the first scene.

9. An apparatus for observing a virtual environment, the apparatus comprising:
at least one memory configured to store program code; and
at least one processor configured to read the program code and operate as instructed by the program code, the program code comprising:
display code configured to cause at least one of the at least one processor to display a first environment screen of an application program, the first environment screen comprising a virtual object in a first scene, and the first environment screen being a screen in which the virtual environment is observed in a first observation manner;
receiving code configured to cause at least one of the at least one processor to receive a moving operation, upon which the virtual object is moved from the first scene to a second scene;
detecting code configured to cause at least one of the at least one processor to detect whether the virtual object is moved from an outdoor scene to an indoor scene according to the moving operation;
adjustment code configured to cause at least one of the at least one processor to adjust the first observation manner to a second observation manner according to the moving operation, the first observation manner corresponding to the outdoor scene, and the second observation manner corresponding to the indoor scene,
the display code being further configured to cause at least one of the at least one processor to display a second environment screen of the application program, the second environment screen comprising the virtual object in the second scene, and the second environment screen being a screen in which the virtual environment is observed in the second observation manner,
wherein the detecting code configured to cause at least one of the at least one processor to:
scan, by using a target point in the virtual object as a starting point, one or more rays along a vertically upward direction and/or a horizontal direction in the virtual environment;
detect whether the virtual object is in the outdoor scene or the indoor scene according to a result of the scanning.

10. The apparatus according to claim 9, wherein the first observation manner corresponding to the outdoor scene comprises a manner in which a camera model observes the virtual environment at a first distance from the virtual object, and the second observation manner corresponding to the indoor scene comprises a manner in which the camera model observes the virtual environment at a second distance from the virtual object, the camera model comprising a three-dimensional model observing around the virtual object in the virtual environment, and the first distance being greater than the second distance.

11. The apparatus according to claim 9, wherein the first observation manner corresponding to the outdoor scene comprises a manner in which a camera model observes the virtual environment from a first perspective, and the second observation manner corresponding to the indoor scene comprises a manner in which the camera model observes the virtual environment from a second perspective, the camera model comprising a three-dimensional model observing around the virtual object, and an angle between a direction of the first perspective and the horizontal direction in the virtual environment being less than an angle between a direction of the second perspective and the horizontal direction.

12. The apparatus according to claim 9, wherein the adjustment code is further configured to cause at least one of the at least one processor to perform, by using a-the target point in the virtual object as the starting point, vertical ray detection along the vertically upward direction in the virtual environment; receive a first detection result of the vertical ray detection, the first detection result indicating a virtual item collided with a ray in the vertically upward direction of the virtual object; and determine the first scene and the second scene according to the first detection result.

13. The apparatus according to claim 12, wherein the first detection result comprises an item identifier of a first virtual item that is collided with the ray during the vertical ray detection, and
the adjustment code is further configured to cause at least one of the at least one processor to:
determine, based on the item identifier, which is included in the first detection result obtained in the second scene, corresponding to an identifier of a virtual structure, that the second scene is the indoor scene; and
determine, based on the item identifier, which is included in the first detection result obtained in the first scene, corresponding to another identifier other than the identifier of the virtual structure, that the first scene is the outdoor scene.

14. The apparatus according to claim 12, wherein the first detection result comprises a length of the ray that is collided with a first virtual item in the vertical ray detection, and
the adjustment code is further configured to cause at least one of the at least one processor to:
determine, based on the length of the ray in the first detection result obtained in the second scene being less than or equal to a preset length, that the second scene to which the virtual object is moved is the indoor scene; and
determine, based on the length of the ray in the first detection result exceeding the preset length, that the first scene from which the virtual object is moved is the outdoor scene.

15. The apparatus according to claim 9, wherein the adjustment code is further configured to cause at least one of the at least one processor to:
scanning, by using the target point in the virtual object as the starting point, at least three detection rays with different directions along the horizontal direction in the virtual environment, an angle between every two detection rays being greater than a preset angle;
receiving a second detection result of a horizontal ray detection using the at least three detection rays, the second detection result indicating a virtual item collided with a ray of the at least three detection rays in the horizontal direction; and
determining, according to the second detection result, the first scene and the second scene.

16. The apparatus according to claim 15, wherein the second detection result comprises ray lengths of the at least three detection rays collided with a first virtual item, and
the adjustment code is further configured to cause at least one of the at least one processor to:
determine that the second scene is the indoor scene based on ray lengths of no less than half of the at least three detection rays not exceeding a preset length during collision with the first virtual item in the second detection result obtained in the second scene; and determine that the first scene the outdoor scene based on ray lengths of more than half of the at least three detection rays exceeding the preset length during collision with the first virtual item in the second detection result obtained in the first scene.

17. A non-transitory computer-readable storage medium, storing computer-readable instructions, wherein the computer-readable instructions are executable by one or more processors to cause the one or more processors to perform:

displaying a first environment screen of an application program, the first environment screen comprising a virtual object in a first scene, and the first environment screen being a screen in which a virtual environment is observed in a first observation manner;

receiving a moving operation based on which the virtual object is moved from the first scene to a second scene;

detecting whether the virtual object is moved from an outdoor scene to an indoor scene according to the moving operation by:

scanning, by using a target point in the virtual object as a starting point, one or more rays along a vertically upward direction and/or a horizontal direction in the virtual environment;

detecting whether the virtual object is in the outdoor scene or the indoor scene according to a result of the scanning;

adjusting the first observation manner to a second observation manner according to the moving operation, the first observation manner corresponding to the outdoor scene, and the second observation manner corresponding to the indoor scene; and displaying a second environment screen of the application program, the second environment screen comprising the virtual object in the second scene, and the second environment screen being a screen in which the virtual environment is observed in the second observation manner.

* * * * *